(12) United States Patent
Hahn et al.

(10) Patent No.: US 11,964,725 B2
(45) Date of Patent: Apr. 23, 2024

(54) LOW POWER CONTROL FOR A CONTROL DEVICE FOR A BICYCLE

(71) Applicant: SRAM, LLC, Chicago, IL (US)

(72) Inventors: Sage Hahn, Chicago, IL (US); Kristi Lin, Chicago, IL (US); Alexander Kon-I Ho, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 354 days.

(21) Appl. No.: 17/462,759

(22) Filed: Aug. 31, 2021

(65) Prior Publication Data

US 2023/0060541 A1  Mar. 2, 2023

(51) Int. Cl.
| | |
|---|---|
| *B62J 45/20* | (2020.01) |
| *B62J 1/28* | (2006.01) |
| *B62K 25/00* | (2006.01) |
| *B62M 9/06* | (2006.01) |
| *H04W 24/08* | (2009.01) |
| *H04W 52/02* | (2009.01) |
| *H04W 72/0446* | (2023.01) |
| *B62J 43/30* | (2020.01) |

(52) U.S. Cl.
CPC ............. *B62J 45/20* (2020.02); *B62J 1/28* (2013.01); *B62K 25/00* (2013.01); *B62M 9/06* (2013.01); *H04W 24/08* (2013.01); *H04W 52/0274* (2013.01); *H04W 72/0446* (2013.01); *B62J 43/30* (2020.02)

(58) Field of Classification Search
CPC .... Y10T 74/2003; G08C 17/02; H04B 1/082; H04B 1/1036; H04W 74/08; B62K 23/02; B62M 25/08; B62M 9/132; B62M 9/122; B62J 2099/002
See application file for complete search history.

(56) References Cited

U.S. PATENT DOCUMENTS

| | | | |
|---|---|---|---|
| 3,863,512 | A | 2/1975 | Crawley |
| 5,254,044 | A | 10/1993 | Anderson |
| 5,494,307 | A | 2/1996 | Anderson |
| 5,599,244 | A | 2/1997 | Ethington |
| 5,870,381 | A | 2/1999 | Kawasaki et al. |
| 6,023,646 | A | 2/2000 | Kubacsi et al. |
| 6,204,775 | B1 | 3/2001 | Kubacsi |
| 6,623,389 | B1 | 9/2003 | Campagnolo |
| 7,274,907 | B1 | 9/2007 | Perotti et al. |

(Continued)

FOREIGN PATENT DOCUMENTS

| | | |
|---|---|---|
| CN | 1316364 | 10/2001 |
| CN | 1550408 | 12/2004 |

(Continued)

*Primary Examiner* — John Kwon

(57) ABSTRACT

A control device of a bicycle includes an actuator and a first controller. The first controller is configured to generate and transmit, from the first controller to a second controller of the bicycle, messages for a predetermined time period at a first transmission rate in response to activation of the actuator. The first controller is further configured to, after the predetermined period of time, generate and transmit, from the first controller to the second controller, one or more messages at a second transmission rate until the actuator is deactivated. The first transmission rate is greater than the second transmission rate, and each of the messages includes data identifying the activation of the actuator.

20 Claims, 18 Drawing Sheets

(56) References Cited

U.S. PATENT DOCUMENTS

| | | |
|---|---|---|
| 7,381,142 B2 | 6/2008 | Campagnolo |
| 7,623,931 B2 | 11/2009 | Campagnolo et al. |
| 7,704,173 B2 | 4/2010 | Ichida et al. |
| 7,761,212 B2 | 7/2010 | Takebayashi |
| 8,271,058 B2 | 9/2012 | Rhee et al. |
| 8,655,561 B2 | 2/2014 | Kitamura |
| 8,721,495 B2 | 5/2014 | Kitamura et al. |
| 8,874,338 B2 | 10/2014 | Miglioranza |
| 8,918,665 B2 | 12/2014 | Low et al. |
| 2003/0207731 A1 | 11/2003 | Oohara |
| 2004/0063528 A1 | 4/2004 | Campagnolo |
| 2004/0235597 A1 | 11/2004 | Guderzo |
| 2005/0143145 A1 | 6/2005 | Maekawa |
| 2005/0255831 A1 | 11/2005 | Kato et al. |
| 2007/0155553 A1 | 7/2007 | Campagnolo et al. |
| 2008/0017245 A1* | 1/2008 | Kessler ................. G05B 15/02 137/552 |
| 2009/0102628 A1 | 4/2009 | Takebayashi |
| 2009/0240858 A1 | 9/2009 | Takebayashi |
| 2009/0315692 A1 | 12/2009 | Miki et al. |
| 2010/0112950 A1 | 5/2010 | Haartsen et al. |
| 2010/0214222 A1 | 8/2010 | Yen |
| 2011/0045875 A1 | 2/2011 | Rhee et al. |
| 2011/0320093 A1 | 12/2011 | Kitamura |
| 2012/0035011 A1 | 2/2012 | Menachem et al. |
| 2013/0307678 A1 | 11/2013 | Ransom |
| 2014/0015659 A1 | 1/2014 | Tetsuka |
| 2014/0087901 A1 | 3/2014 | Shipman |
| 2015/0106996 A1 | 4/2015 | Lau |
| 2016/0185421 A1 | 6/2016 | Komatsu |
| 2016/0318582 A1 | 11/2016 | Johnson |
| 2016/0339986 A1 | 11/2016 | Jordan et al. |
| 2022/0369926 A1* | 11/2022 | Bernstein ................. H04W 4/80 |
| 2023/0060541 A1* | 3/2023 | Hahn ................... H04W 24/08 |
| 2023/0114984 A1* | 4/2023 | Katrak ................ G06F 11/0772 714/37 |

FOREIGN PATENT DOCUMENTS

| | | |
|---|---|---|
| CN | 101417689 | 4/2009 |
| CN | 101547012 | 9/2009 |
| CN | 101977808 | 2/2011 |
| CN | 102298830 | 12/2011 |
| CN | 102791570 | 11/2012 |
| CN | 204895738 | 12/2015 |
| CN | 105501382 | 4/2016 |
| CN | 105667702 | 6/2016 |
| EP | 0841243 | 5/1998 |
| EP | 1103456 | 5/2001 |
| EP | 1475302 | 11/2004 |
| EP | 1759971 | 3/2007 |
| EP | 2052960 | 4/2009 |
| EP | 2135804 | 12/2009 |
| EP | 2399813 | 12/2011 |
| EP | 2719616 | 4/2014 |
| TW | 200505739 | 2/2005 |
| TW | 1233908 | 6/2005 |
| TW | 200941421 | 10/2009 |
| TW | M396791 | 1/2011 |
| TW | M407200 | 7/2011 |
| TW | 201623087 | 7/2016 |
| TW | 202128492 | 8/2021 |

* cited by examiner

LOW POWER CONTROL FOR A CONTROL DEVICE FOR A BICYCLE

BACKGROUND

1. Field of the Disclosure

The present disclosure is generally directed to control of bicycle components, and more particularly, to low power control for a control device of the bicycle.

2. Description of Related Art

For bicycle electronic shifting systems, electronic bicycle systems, bicycle suspension systems, and electronic seat post systems, one or more electronic control devices are placed on the bicycle handlebar and/or another rider accessible location on the bicycle or elsewhere. The one or more electronic control devices each include one or more buttons and/or levers (e.g., shifters).

The one or more electronic control devices remain in a lower power state until a switch of an electronic control device is activated. Once the switch is activated, the electronic control device begins transmitting messages (e.g., message packets) continuously until the switch is deactivated. The transmitted messages include information about which switch of the electronic control device is active.

SUMMARY

In one example, a control device of a bicycle includes an actuator and a first controller. The first controller is configured to generate and transmit, from the first controller to a second controller of the bicycle, messages for a predetermined time period at a first transmission rate in response to activation of the actuator. The first controller is further configured, after the predetermined time period, to generate and transmit, from the first controller to the second controller, one or more messages at a second transmission rate until the actuator is deactivated. The first transmission rate is greater than the second transmission rate, and each of the messages includes data identifying the activation of the actuator.

In one example, the first controller is further configured to generate and transmit, from the first controller to the second controller, a second message in response to deactivation of the actuator. The second message includes data identifying the deactivation of the actuator.

In one example, the first controller is further configured to determine an amount of time the actuator has been activated, compare the determined amount of time to a predetermined pairing mode threshold time period, and based on the comparison, transition the first controller to a pairing mode when the determined amount of time is greater than the predetermined pairing mode threshold time period. The generation and transmission of the second message includes generation and transmission, from the first controller to the second controller, of the second message in response to the deactivation of the actuator when, based on the comparison, the determined amount of time is less than the predetermined pairing mode threshold time period.

In one example, the predetermined time period is a first predetermined time period. The transmission of the one or more messages at the second transmission rate includes periodic transmission of the one or more messages. The periodic transmission of the one or more messages includes transmission of a respective message of the one or more messages once every second predetermined time period.

In one example, the transmission of the messages from the first controller to the second controller at the first transmission rate includes continuous transmission of the messages from the first controller to the second controller while the second controller is in an intermittent receive mode, in which the second controller is configured to receive packets during part of every third predetermined time period.

In one example, the first predetermined time period is greater than the third predetermined time period.

In one example, the first controller includes a transmitter. The transmitter is configured to intermittently transmit the one or more messages, such that the one or more messages are transmitted at the second transmission rate. The first controller is configured to turn off the transmitter between the intermittent transmissions of the one or more messages.

In one example, the first controller is further configured to turn off a microprocessor high frequency clock of the transmitter between the intermittent transmissions of the one or more messages.

In one example, the first controller includes a radio. The radio is configured to measure ambient radio frequency power at a frequency of the transmission of the messages at the first transmission rate. The first controller is further configured to compare the measured ambient radio frequency power to a predetermined ambient threshold radio frequency power, and based on the comparison, when the measured ambient radio frequency power is greater than the predetermined ambient threshold radio frequency power, transition the generation and transmission of the one or more messages at the second transmission rate to continuous generation and transmission of the messages.

In one example, the radio is configured to measure the ambient radio frequency power before, after, or before and after the transmission of each message of the one or more messages.

In one example, an electronic component of a bicycle includes a first controller configured to listen for a message in a first receive mode of the first controller, in which the first controller is configured to listen for the message at a first receive rate. The first controller is further configured to receive the message from a second controller of the bicycle, and in response to the receipt of the message, transition the first controller from the first receive mode to a second receive mode, in which the first controller is configured to listen for one or more additional messages at a second receive rate. The second receive rate is greater than the first receive rate.

In one example, the first controller is further configured to exit the second receive mode of the first controller when the first controller does not receive an additional message of the one or more additional messages within a predetermined time period associated with the second controller.

In one example, the predetermined time period associated with the second controller is an intermittent transmit time period of the second controller.

In one example, the exit of the second receive mode of the first controller includes transition of the first controller from the second receive mode to the first receive mode.

In one example, the electronic component is a rear derailleur, a front derailleur, a seat post assembly, or a suspension assembly of the bicycle.

In one example, the first controller includes a receiver and a processor. The processor of the first controller is configured to turn off the receiver of the first controller during part of every respective receive time period corresponding to the first receive rate.

In one example, the second receive mode is a continuous receive mode.

In one example, when the received message includes data indicating deactivation of a switch of the second controller, the first controller is further configured to initiate an action of the electronic component when the first controller has not received any additional messages including data indicating activation of the switch within a predetermined time period prior to the receipt of the message.

In one example, when the received message includes data indicating activation of a switch of the second controller, the first controller is further configured to identify a most recently received message. The most recently received message is the received message or an additional message of the one or more additional messages. When the received message includes data indicating activation of a switch of the second controller and when the most recently received message includes the data indicating activation of the switch of the second controller, the first controller is further configured to determine a time period since the most recently received message, and assume the switch of the second controller has been deactivated when the determined time period is greater than a predetermined time period. An action of the electronic component is initiated based on the assumed deactivation of the switch of the second controller.

In one example, a method for controlling an electronic component of a bicycle includes generating, by a first controller of the bicycle, and transmitting, from the first controller to a second controller of the bicycle, messages for a first predetermined time period at a first transmission rate in response to activation of a switch of the first controller. The method also includes listening, by the second controller, for one of the messages in a first receive mode of the second controller, in which the second controller is configured to listen for the message at a first receive rate, and receiving, by the second controller, the one message. The method includes in response to the receiving, transitioning the second controller from the first receive mode to a second receive mode, in which the second controller is configured to listen for one or more additional messages at a second receive rate. The second receive rate is greater than the first receive rate. The method also includes after the first predetermined time period, generating, by the first controller, and transmitting, from the first controller to the second controller, one or more messages at a second transmission rate until the switch is deactivated. The second transmission rate is less than the first transmission rate.

BRIEF DESCRIPTION OF THE DRAWINGS

Objects, features, and advantages of the present invention will become apparent upon reading the following description in conjunction with the drawing figures, in which.

Other aspects and advantages of the embodiments disclosed herein will become apparent upon consideration of the following detailed description, wherein similar or identical structures have similar reference numerals.

DETAILED DESCRIPTION OF THE DISCLOSURE

Figure 1A:
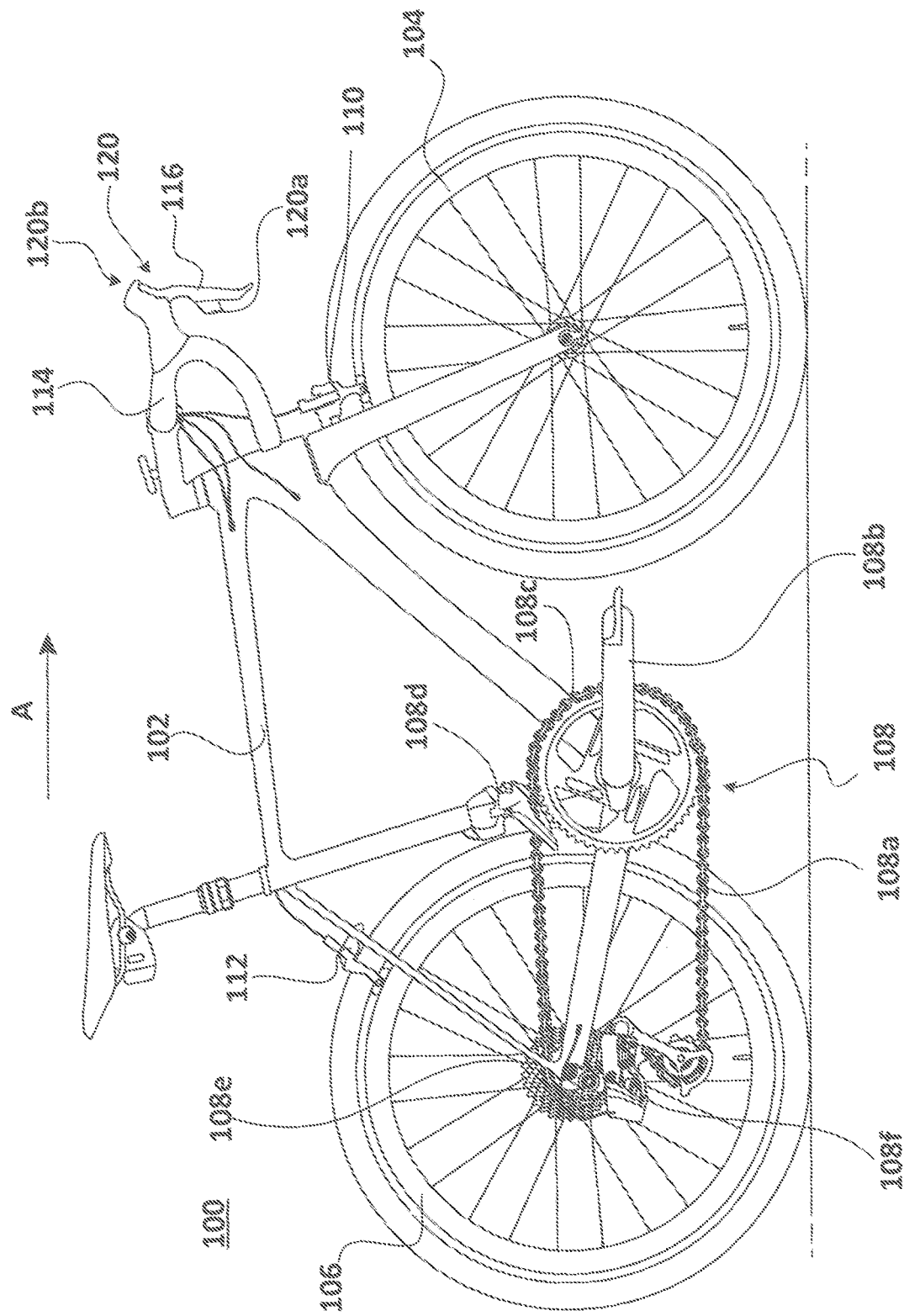
FIG. 1A is a right-side view of an example road bicycle that may implement aspects of the present disclosure.

For a bicycle that includes a number of electrically actuated components, each with a number of actions controlled by, for example, one or more electronic control devices (e.g., including one or more buttons, respectively), a number of buttons corresponding to the number of electrically actuated components or the number of controlled actions may be included on and/or off the bicycle. Each button press and/or each combination of button presses causes a reaction by another device (e.g., a receiving device) on the bicycle such as, for example, a rear derailleur inboard shift, a rear derailleur outboard shift, or a front derailleur position toggle. In the case of the rear derailleur, a press and hold of a button associated with the rear derailleur may cause multiple shifts at some time interval until the button is released. Other buttons may have one function when the button is pressed and another function when the button is released. For example, a valve of a seat post may be opened when a button is pressed, which allows the seat post to be compressed or extended, and the valve of the seat post may be closed when the button is released, which locks the seat post in a position.

The electronic control devices on the bicycle may be battery powered, and, if necessary, frequent replacement of the batteries adds cost and complexity to maintenance of the bicycle. In order to extend battery life of an electronic control device of the bicycle, a rate of message generation and transmission from the electronic control device to a receiving device is reduced once the electronic control device has transmitted long enough to overlap with a listening period of the receiving device. When a switch of the electronic control device is activated (e.g., via user interaction with an actuator of the electronic control device), the electronic control device generates and transmits, from the electronic control device to a controller of the bicycle, messages at a first transmission rate (e.g., continuously while allowing for interleaving with other transmitters on a same channel) for a predetermined period of time. The predetermined period of time is greater than or equal to a receive period of the receiving device. After the predetermined period of time, the electronic control device transitions the rate of message generation and transmission from the first transmission rate to a second transmission rate that is less than the first transmission rate.

The electronic control device generates and transmits the messages at the first transmission rate for the predetermined period of time due to the receiving device not running in a continuous receive mode to save power. The receiving device may receive for a shorter first part (e.g., 5 ms) of the receive period of the receiving device, and the receiving device may then turn off a receiver of the receiving device for a longer second part (e.g., 45 ms) of the receive period.

When the receiving device receives a message from the electronic control device during the receive period, the receiver of the receiving device latches on to the electronic control device for an extended period so as to receive further messages from the electronic control device without delay. In other words, the receiving device may transition to a continuous receive state after the message is received from the electronic control device.

A significant advantage of the disclosed bicycle component control is the extension of battery life for electronic control devices of a bicycle. Batteries of the electronic control devices, respectively, thus require replacement less frequently, which reduces cost and complexity of maintenance of the bicycle. Another advantage of the disclosed bicycle component control is cold weather performance for electronic control devices of a bicycle.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. One or more of the components may also be paired with a separate device like a computer, tablet, or phone (e.g., a mobile device). This paired device may provide the user interface to allow the user to communicate with the components on the bicycle. Examples of communication are updating firmware, setting variables, and running diagnostic tools and analysis.

FIG. 1A illustrates a right side view of an example road bicycle 100. The bicycle 100 includes a frame 102, a front wheel 104, a rear wheel 106, and a drivetrain 108. The front wheel 104 and the rear wheel 106 are rotatably coupled to the frame 102. The bicycle 100 includes a front brake 110 for braking the front wheel 104 and a rear brake 112 for braking the rear wheel 106. To allow a user to steer the bicycle 100, the bicycle 100 includes a handlebar assembly 114 attached to the frame 102.

Figure 1B:
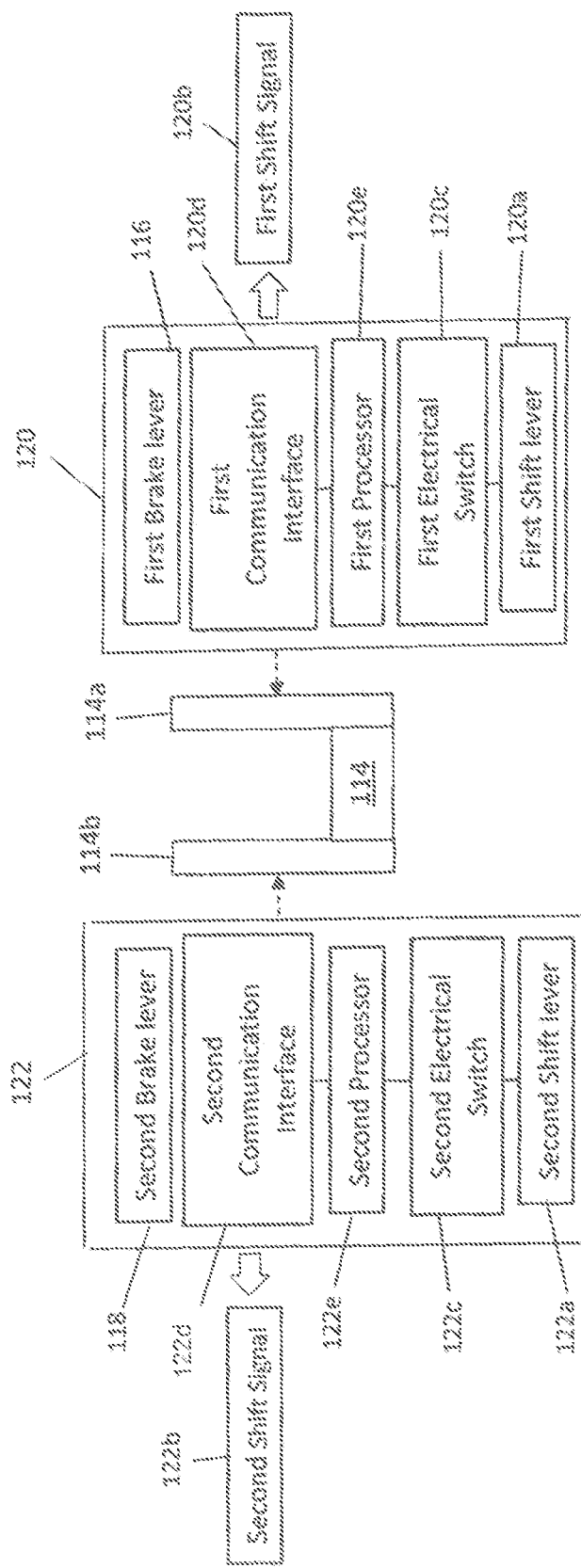
FIG. 1B is a schematic diagram of a handlebar assembly of the example road bicycle shown in FIG. 1A, and other components coupled to the handlebar assembly.

FIG. 1B illustrates a schematic diagram depicting the handlebar assembly 114 and other components coupled to the handlebar assembly 114. As shown in FIG. 1A and/or FIG. 1B, the handlebar assembly 114 includes a right drop bar 114a and a left drop bar 114b to accommodate the right hand and the left hand of the user, respectively. The bicycle 100 includes a first or right controller device 120 coupled to the right drop bar 114a. The first controller device 120 includes a first or right brake lever 116 to allow the user to operate the rear brake 112. Correspondingly, the bicycle 100 includes a second or left controller device 122 coupled to the left drop bar 114b. The second controller device 122 includes a second or left brake lever 118 to allow the user to operate the front brake 110.

Figure 1C:
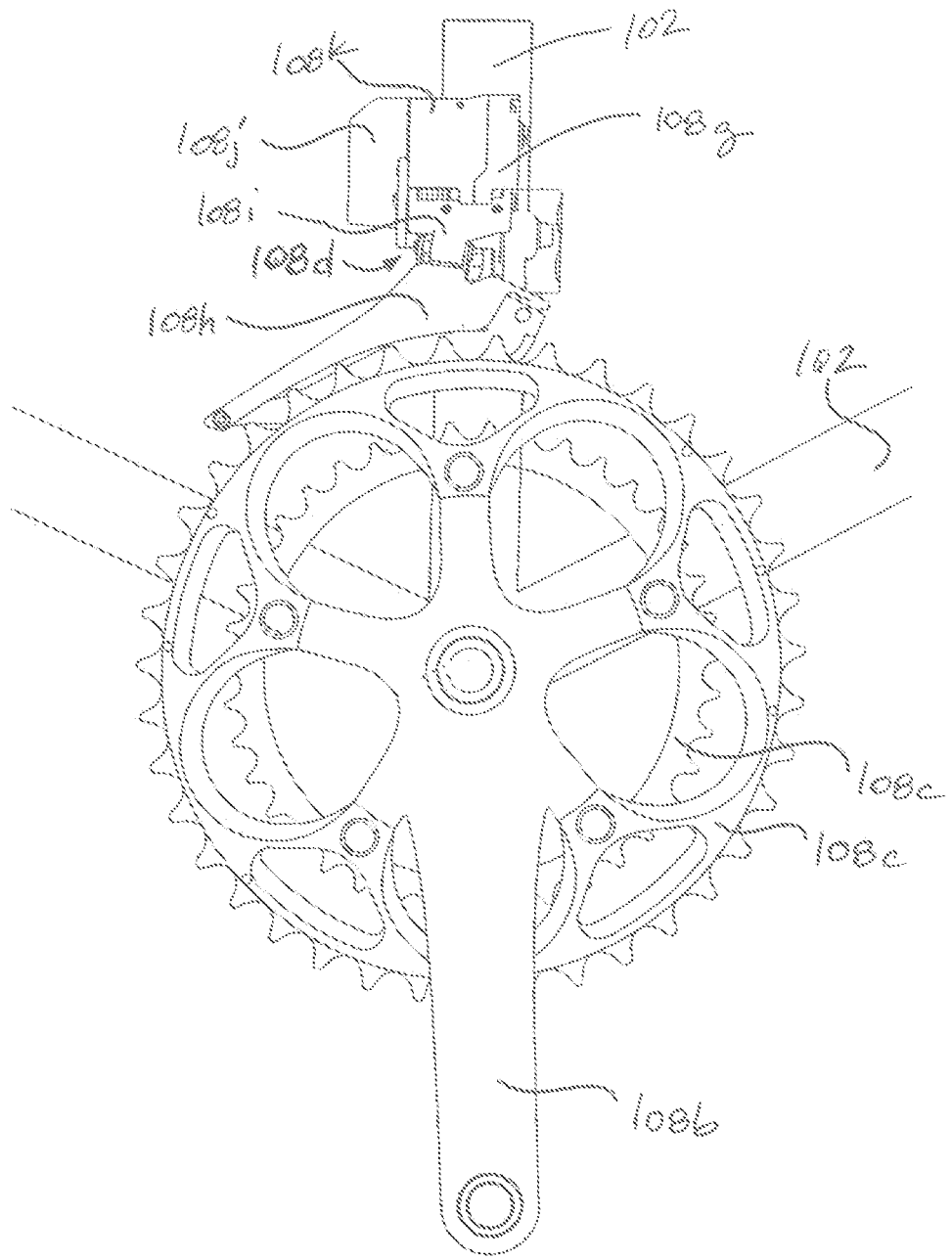
FIG. 1C is a side view of a front derailleur of the example road bicycle shown in FIG. 1.
Figure 1D:
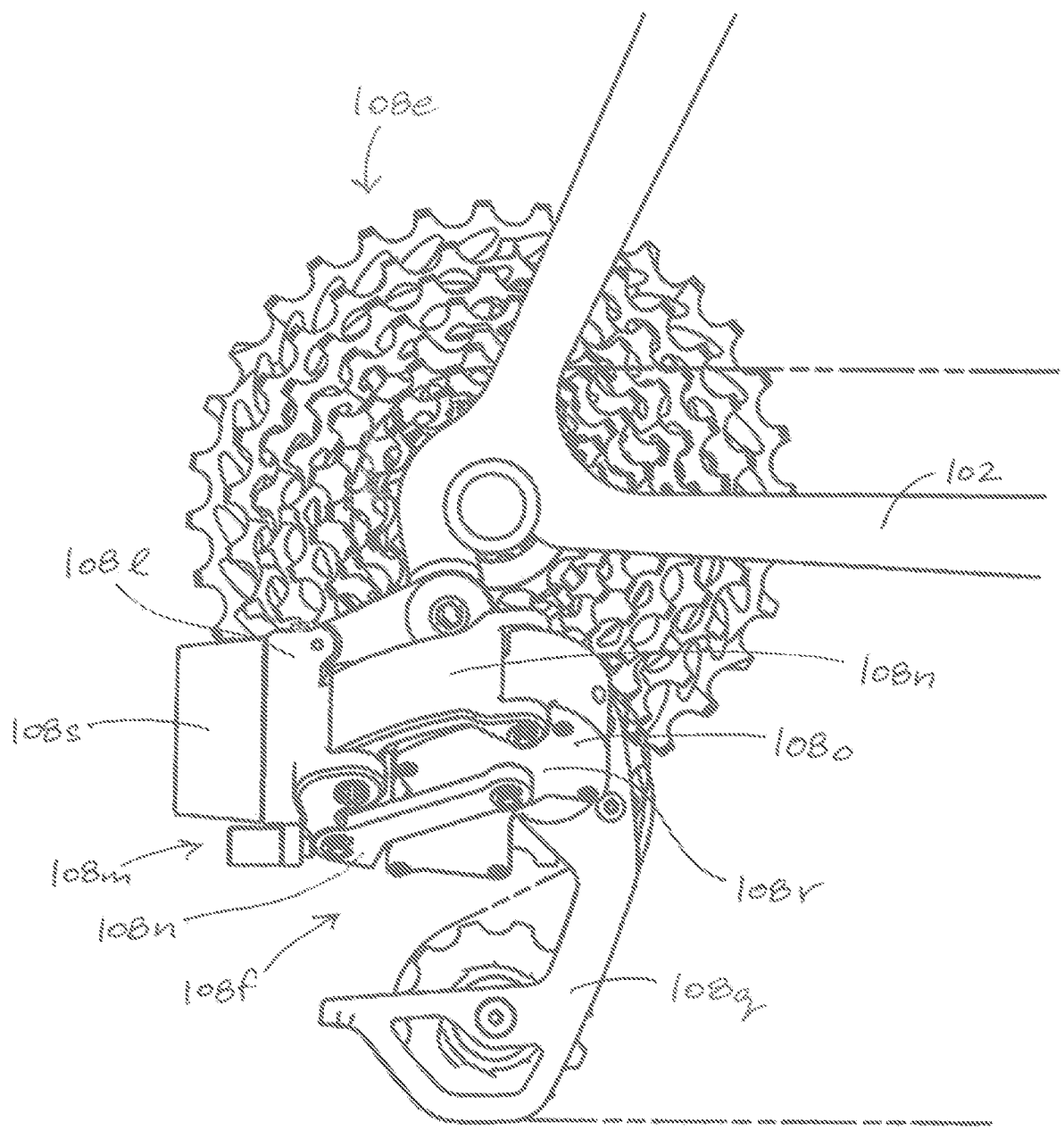
FIG. 1D is a side view of a rear derailleur of the example road bicycle shown in FIG. 1.

As shown in FIGS. 1A, 1C, and 1D, the drivetrain 108 includes a drive chain 108a, a front crank 108b, one or more front chainrings 108c, a front gear changer such as an electromechanical front derailleur 108d, rear sprockets 108e, and a rear gear changer such as an electromechanical rear derailleur 108f. The front chainrings 108c are coupled to the front crank 108b. Diameters and numbers of teeth on the front sprockets 108c may differ from each other. The rear sprockets 108e are coaxially mounted to the rear wheel 106. Diameters and numbers of teeth on the rear sprockets 108e may decrease from left to right. Alternatively, the diameters and the numbers of teeth on the rear sprockets 108e may decrease from right to left. The chain 108a engages a selected chainring 108c and a selected sprocket 108e.

To drive the bicycle 100, the user may pedal to rotate the front crank 108b relative to the frame 102. Rotation of the front crank 108b causes the selected chainring 108c to rotate and the chain 108a to move through the drivetrain 108. Movement of the chain 108a causes corresponding rotation of the selected sprocket 108e and thus the rear wheel 106. Rotation of the rear wheel 106 against the ground may propel the bicycle 100 in a forward direction. The front and/or forward orientation and movement of the bicycle 100 is indicated by the direction of arrow "A." Further, other terms relating to direction may be used herein. For example, the "inboard" and "outboard," and "left" and "right" may be used. The terms "right" and "left," and "inboard" and "outboard" describe a position between parts or items and a vertical plane substantially bisecting the bicycle or a direction toward or away from the vertical plane substantially bisecting the bicycle. Moreover, terms such as "front" and "rear" referred to bicycle mechanisms conventionally mounted to the bicycle and with the bicycle oriented in the forward direction.

The selected chainring 108*c* and the selected sprocket 108*e*, in combination, determine a gear ratio for driving the bicycle 100. Operation of the front derailleur 108*d* allows the user to change the selected chainring 108*c* engaged by the chain 108*a*. for example, the front derailleur 108*d* may be actuated to shift the chain 108*a* left or right from one chainring 108*c* to the other. The front derailleur 108*d* is shown as a wireless electrically-actuated front derailleur mounted to the frame 102. The front derailleur 108*d* may include a base member 108*g* mounted to the bicycle frame 102 and a chain guide assembly 108*h* or cage movably connected to the base member 108*g* by a front linkage 108*i* in the form of a parallelogram. A front power supply 108*j* (e.g., a removable battery) may be mounted on the front derailleur 108*d*. The front power supply 108*j* may supply power to a front motor unit 108*k*. The front motor unit 108*k* is configured to supply torque to the components of the front derailleur 108*d* to move the chain guide assembly 108*h* relative to the front base member 108*g* such that the front derailleur 108*d* may shift the chain 108*a* between the front sprockets 108*c*.

Operation of the rear derailleur 108*f* allows the user to change the selected sprocket 108*e* engaged by the chain 108*a*. For example, the rear derailleur 108*f* may be actuated to shift the chain 108*a* left or right from one sprocket 108*e* to another. The rear derailleur 108*f* is shown in FIGS. 1A and 1D as a wireless electrically-actuated rear derailleur mounted to the frame 102. The rear derailleur may include a base member 108*l* (e.g., a b-knuckle) that is mounted to the bicycle frame 102. A linkage 108*m* may include two links 108*n* that are pivotally connected to the base member 108*l*. A movable member 108*o* (e.g., a p-knuckle) may be connected to the linkage 108*m*. A chain guide assembly 108*q* or cage may be configured to engage and maintain tension in the chain 108*a* and may be pivotally connected to a part of the movable member 108*o*.

A motor unit 108*r* and rear power supply 108*s* (e.g., a removable battery) are disposed on the rear derailleur 108*f*. The battery 108*s* supplies power to the motor unit 108*r*. In this embodiment, the motor unit 108*r* is disposed in the movable member 108*o*. Alternatively, the motor unit 108*r* may be disposed in one of the links 108*n* or in the base member 108*l*. The motor unit 108*r* may include a motor and a gear transmission. The motor unit 108*r* may be coupled with the linkage 108*m* to laterally move the cage 108*q* and thus shift the chain 108*a* among the rear sprockets 108*e*.

Figure 1E:
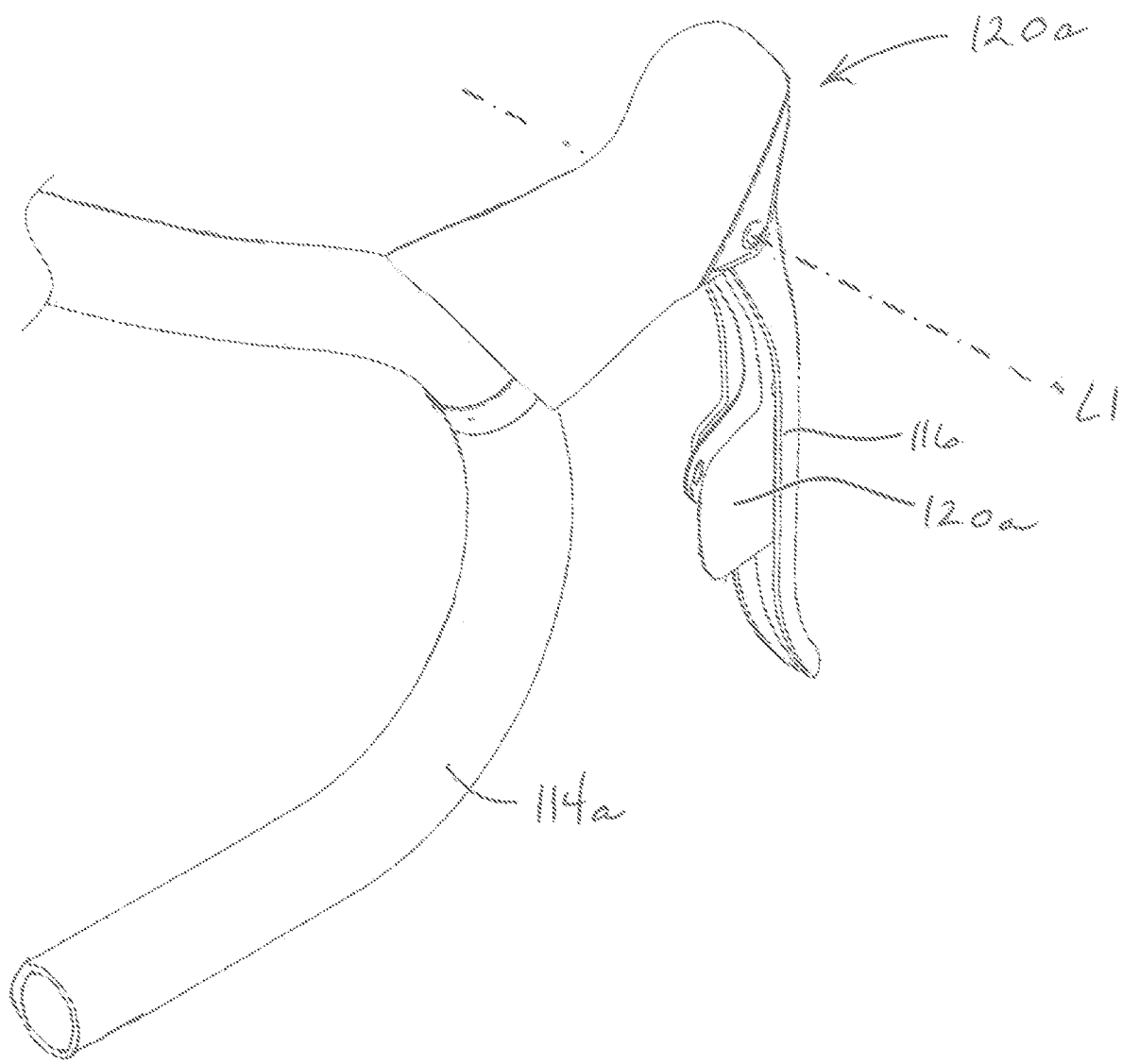
FIG. 1E is a side view of a right controller device of the example road bicycle shown in FIG. 1A coupled to a right drop bar.

Looking to FIGS. 1A, 1B, and 1E, to allow the user to operate the front derailleur 108*d* or the rear derailleur 108*f*, the first controller device 120 and the second controller device 122 include a first electrical switch 120*c* and a second electrical switch 122*c*, respectively. The first electrical switch 120*c* and the second electrical switch 122*c* are actuated by a first input element and a second input element, respectively (e.g., the first shift lever 120*a* and the second shift lever 122*a*, respectively; actuators). The first shift lever 120*a* is configured to receive a right input from the right hand of the user and actuate the first electrical switch 120*c*. The second shift lever 122*a* is configured to receive a left input from the left hand of the user and actuate the second electrical switch 122*c*. The first shift lever 120*a* may be positioned behind the first brake lever 116, while the second shift lever 122*a* may be positioned behind the second brake lever 118.

To provide the right input to the first shift lever 120*a*, the user may manually apply pressure on the right side of the first shift lever 120*a*. In response, the first shift lever 120*a* may pivot about a first shift lever axis L1 from an initial rest position to a shift actuation position. The first shift lever 120*a* may be biased with a spring or the like so that when the manual pressure is no longer applied by the user, the first shift lever 120*a* returns to the initial rest position. Similarly, to provide the left input to the second shift lever 122*a*, the user may manually apply pressure on the left side of the second shift lever 122*a*. In response, the second shift lever 122*a* may pivot about a second shift lever axis L2 (not shown) from an initial rest position to a shift actuation position. The second shift lever 122*a* may be biased with a spring or the like so that when the manual pressure is no longer applied by the user, the second shift lever 122*a* returns to the left starting position.

The first controller device 120 and the second controller device 122 include a first controller processor 120*e* and a second controller processor 122*e*, respectively, that electronically process the manual input received by the first shift lever 120*a* and the second shift lever 122*a*, respectively. For example, the right input triggers a first controller communication interface 120*d* to wirelessly send a first shift signal 120*b*, and the left input triggers a second controller communication interface 122*d* to wirelessly send a second shift signal 122*b*. Correspondingly, the front derailleur 108*d* and the rear derailleur 108*f* include communication interfaces and processors that are configured to receive and electronically process the first shift signal 120*b* and/or the second shift signal 122*b* to determine a designated response.

A first controller of the first controller device 120, for example, may include any number of components of the first controller device 120. For example, the first controller may include all electronic components of the first controller device 120 (e.g., all components shown in FIG. 1B other than the first shift lever 120*a* and the first brake lever 116). A second controller of the second controller device 122, for example, may include any number of components of the second controller device 122. For example, the second controller may include all electronic components of the second controller device 122 (e.g., all components shown in FIG. 1B other than the second shift lever 122*a* and the second brake lever 118). The first controller and the second controller may include more or fewer components. For example, the first controller may be the first processor 120*e*, and the second controller may be the second processor 122*e*.

In a first scenario, the user provides the right input via the first shift lever 120*a* but does not provide the left input via the second shift lever 122*a*. In response, the first controller device 120 sends the first shift signal 120*b*, while the left controller device 122 sends no signal. When the rear derailleur 108*f* receives the first shift signal 120*b* with no second shift signal 122*b*, the rear derailleur 108*f* shifts the chain 108*a* to engage the next smaller sprocket 108*e* to the right or performs a downshift. Meanwhile, when the front derailleur 108*d* receives the first shift signal 120*b* with no second shift signal 122*b*, the front derailleur 108*d* remains idle.

In a second scenario, the user provides the left input via the second shift lever 122*a* but does not provide the right input via the right shift lever 120*a*. In response, the second controller device 122 sends the second shift signal 122*b*, while the first controller device 120 sends no signal. When the rear derailleur 108*f* receives the second shift signal 122*b* with no first shift signal 120*b*, the rear derailleur 108*f* shifts the chain 108*a* to engage the next larger sprocket 108*e* to the left or performs a upshift. Meanwhile, when the front derailleur 108*d* receives the second shift signal 122*b* with no second shift signal 120*b*, the front derailleur 108*d* remains idle.

In some embodiments, the user may manually apply pressure to the first shift lever 120*a* and/or the second shift lever 122*a* for varying amounts of time. For example, without applying pressure to the second shift lever 122*a*, the user may apply continuous pressure to keep the first shift lever 120*a* in the left final position for a period that exceeds a threshold amount of time, e.g., approximately one second. In response, the first controller device 120 sends the first shift signal 120*b* for a corresponding amount of time, i.e., until the user releases the pressure on the first shift lever 120*a*. When the rear derailleur 108*f* receives the first shift signal 120*b*, the rear derailleur 108*f* determines that the first shift signal 120*b* exceeds a threshold amount of time or a threshold number of messages. In response, rather than merely shifting the chain 108*a* to engage the next sprocket 108*e* to the right, the rear derailleur 108*f* shifts the chain 108*a* repeatedly over multiple sprockets 108*e* to the right until the user releases the pressure on the first shift lever 120*a* and the first shift signal 120*b* ceases, or until the chain 108*a* reaches the right-most sprocket 108*e*. Alternatively, to shift the chain 108*a* repeatedly over multiple sprockets 108*e* to the left, the user may apply continuous pressure to the left shift lever 122*a* for a period that exceeds the threshold amount of time or the threshold number of messages received.

As shown in FIGS. 1A and 1B, the first controller device 120 and the second controller device 122 employ the first shift lever 120*a* and the second shift lever 122*a* as respective input elements to generate corresponding wireless shift signals 120*b*, 122*b* (e.g., including messages and/or message packets) to actuate the front derailleur 108*d* and the rear derailleur 108*f*. Alternative embodiments, however, may include controller devices with different configurations to control a front derailleur and/or a rear derailleur. For example, a bicycle may include aerobars with pushbuttons instead of drop bars with shift levers, where the pushbuttons act as input elements that may be pressed by the user to generate wireless signals that may be received and processed by the front derailleur and the rear derailleur. Also, while some controller devices may be coupled to handlebar assemblies, other controller devices may be coupled to other areas of a bicycle, such as locations throughout the frame. Further, other types of controller devices are contemplated. For example, a unified shifter device may be employed, where the user may press one or more pushbuttons on a mounted box to send signals that control the front derailleur and/or the rear derailleur. Alternatively, a pedal sensor may be employed to receive input from the user via pedaling action by the user, and the front derailleur and/or the rear derailleur may respond to a signal from the pedal sensor (e.g., select gears to maintain a desired cadence or pedal resistance).

Figure 2A:
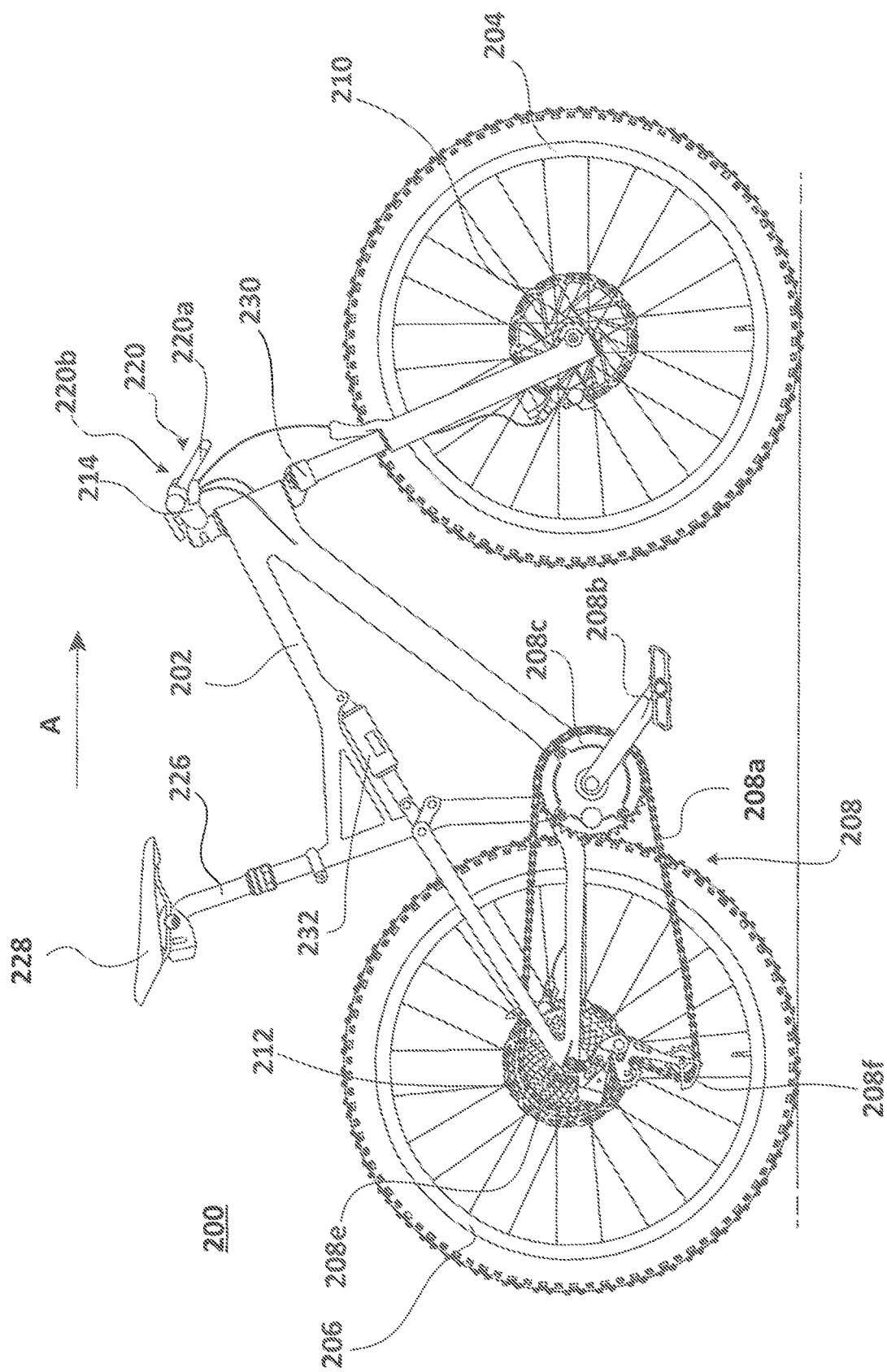
FIG. 2A is a right-side view of an example mountain bicycle that may implement aspects of the present disclosure.

While the example bicycle 100 shown in FIGS. 1A and 1B is a road bicycle, aspects of the present disclosure may be implemented with bicycles of any type. For example, FIG. 2A illustrates a right side view of an example mountain bicycle 200. In some cases, the bicycle 200 may be an e-bike. The bicycle 200 includes a frame 202, a front wheel 204, a rear wheel 206, a drivetrain 208, front disk brakes 210, and rear disk brakes 212. The drivetrain 208 includes a chain 208*a*, a front crank 208*b*, a front chainring 208*c*, rear sprockets 208*e*, and a rear derailleur 208*f*, which operate in a manner similar to the corresponding components of the drivetrain 108 described above.

In contrast to the bicycle 100, the bicycle 200 includes other operating-enacting devices such as a height-adjustable seat post assembly 226, and a front suspension system 230 (e.g., a front suspension assembly) and a rear suspension system 232 (e.g., a rear suspension assembly). In FIGS. 2A and 2C, the seat post assembly 226 is shown as a wireless, electrically-actuated seat post assembly 226 that allows a position of a seat 228 (e.g., a saddle) to be dynamically adjusted. For example, the adjustable seat post 226 may include an operable valve (not shown) that allows the seat 228 to be dropped to a lower height during a ride to change the position of the user (e.g., a rider) relative to the frame 202 and achieve better handling. The seat post assembly 226 includes a first or lower tube 226*a* and a second or upper tube 226*b* (e.g., two tubes). The two tubes 226*a*, 226*b* are movable relative to each other to establish a height of the seat 228 relative to the frame 202. A head 226*c* is fixed to a top of the second tube 226*b*. A seat post motor unit 226*d* is mounted to the head 226*c*, and a power supply 226*e* (e.g., a removable battery) is attached to the motor unit 226*d*. The motor unit 226*d* may include a motor and a gear transmission. The seat post power supply 226*e* may supply power to the seat post motor unit 226*d*. The seat post motor unit 226*d* is configured to supply torque to the components of the seat post assembly 226 to open and close the operable valve.

The front suspension system is shown as a wireless, electrically-actuated front suspension system 230 that allows the suspension characteristics at the front wheel 204 to be dynamically adjusted. Further, the rear suspension system is shown as a wireless, electrically-actuated rear suspension system 232 that allows suspension characteristics at the rear wheel 206 to be dynamically adjusted. The front suspension system 230 and the rear suspension system 232 may further include power supplies such as batteries that supply power to a front suspension motor unit and a rear suspension motor unit, respectively. The front suspension motor unit and the rear suspension motor unit may be configured to supply torque to the components of the front suspension system 230 and the rear suspension system 232, respectively, to open and close one or more valves to change various suspension characteristics.

Figure 2B:
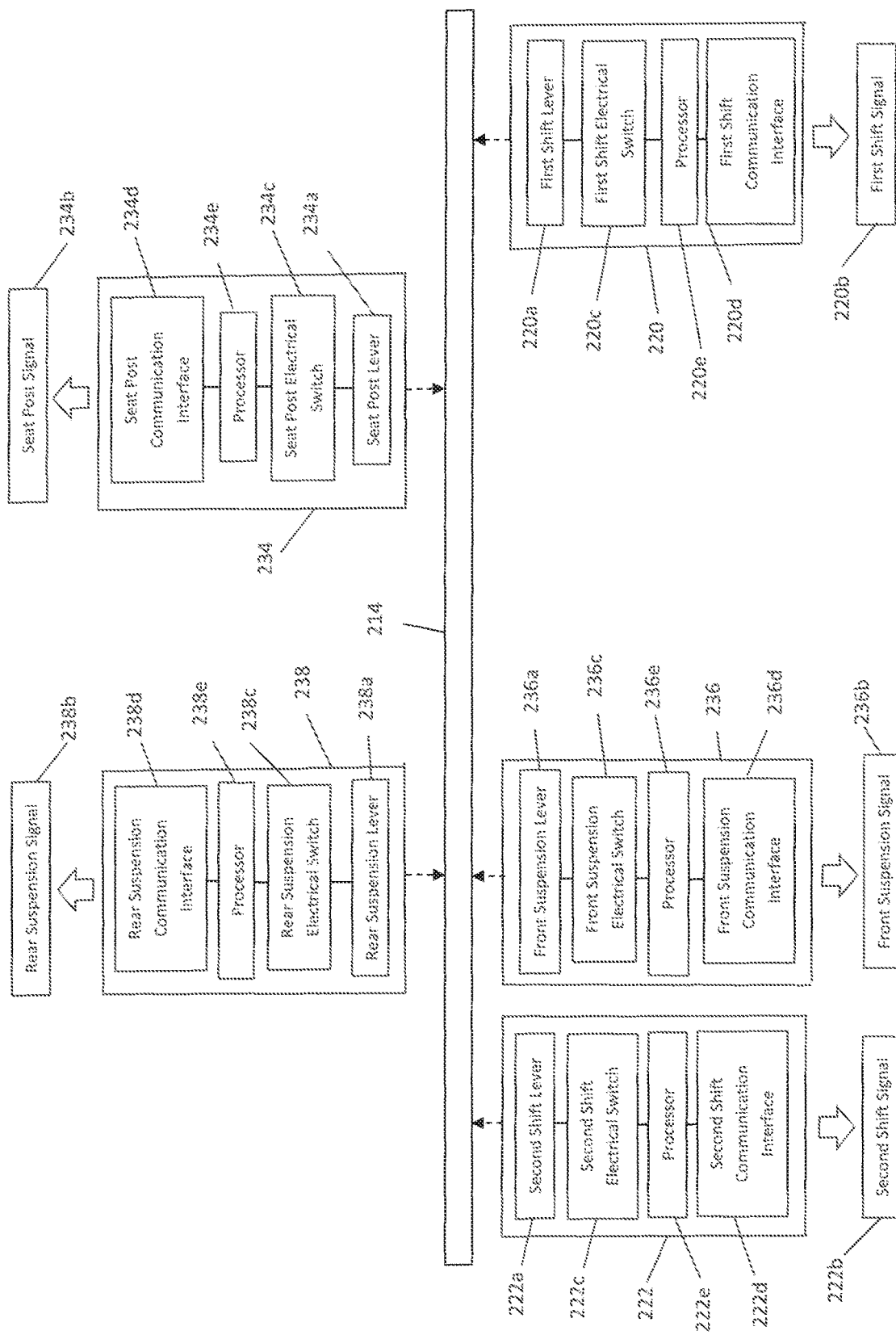
FIG. 2B is a schematic diagram of a handlebar assembly of the example mountain bicycle shown in FIG. 2A, and other components coupled to the handlebar assembly.
Figure 2C:
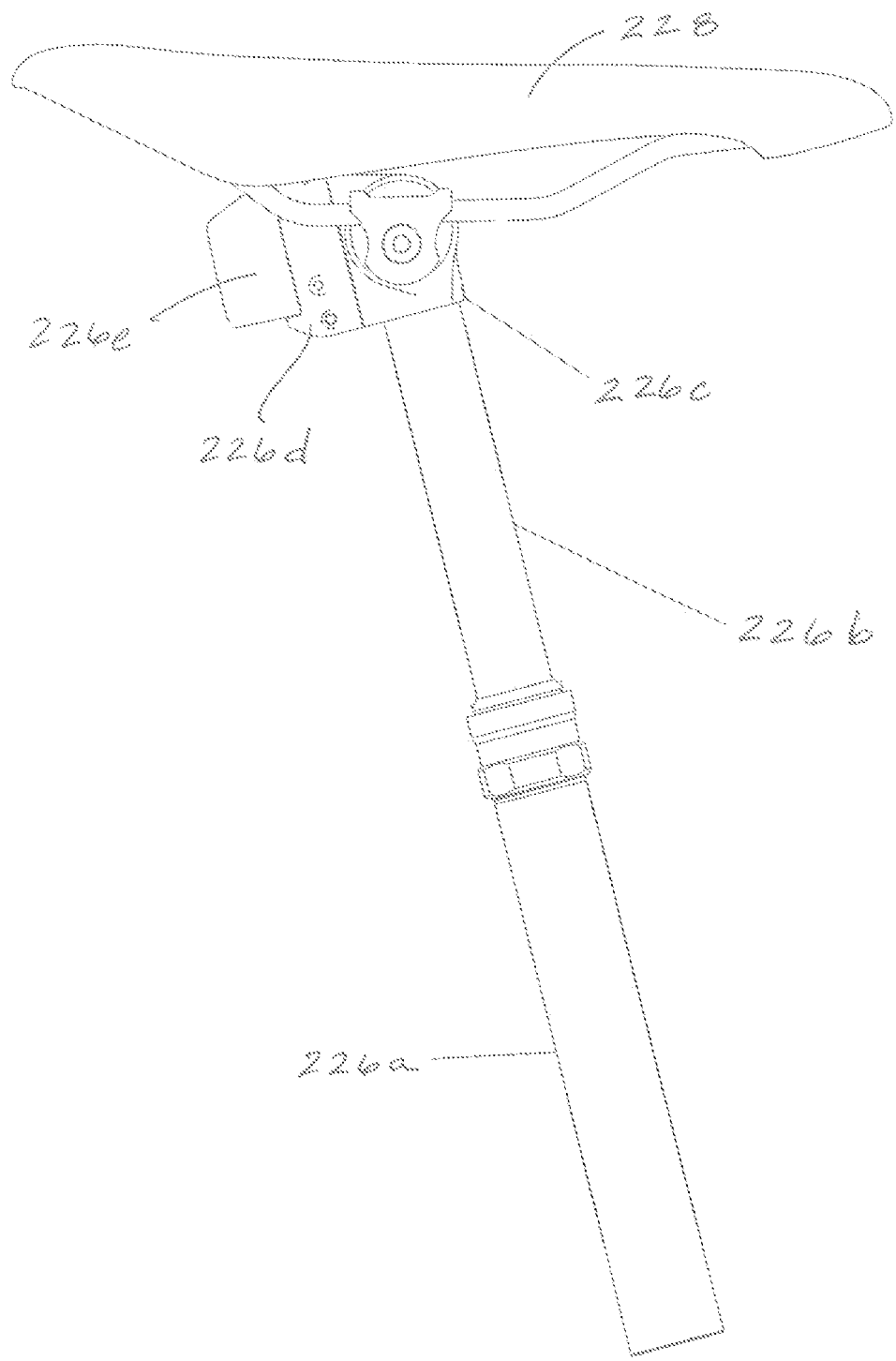
FIG. 2C is a side view of a seat post assembly, with a saddle installed thereon, of the example mountain bicycle shown in FIG. 2A.

Referring to FIGS. 2A and 2B, the bicycle 200 includes a first or right controller device 220 and a second or left controller device 222. The first controller device 220 and the second controller device 222 include a first electrical switch 220*c* and a second electrical switch 222*c*, respectively, that are actuated by a first input element and a second input element, respectively (e.g., a first shift lever or button 220*a* and a second shift lever or button 222*a*, respectively; actuators). The handlebar assembly 214 includes a flat bar or a riser bar instead of drop bars. As such, the first controller device 220 is coupled to a right side of the flat or riser bar, and the second controller device 222 is coupled to a left side of the flat or riser bar. Additionally, the bicycle 200 may include a seat post controller device 234, a front suspension controller device 236, and a rear suspension controller device 238 coupled to the handlebar assembly 214. In other embodiments, one or more of the controller devices (e.g., the first controller device 220 and the seat post controller device 234) may be formed by a single controller device (e.g., a single lever or button).

The user may operate the first shift lever 220*a* and/or the second shift lever 222*a* as described above to generate a first shift signal 220*b* and/or a second shift signal 222*b*, respectively. Similar to the bicycle 100, the first shift signal 220*b* and/or the second shift signal 222*b* may be employed to control the rear derailleur 208*f*. To allow the user to adjust the height of the seat post assembly 226, the seat post controller device 234 includes a seat post electrical switch 234c that is actuated by a seat post input element 234c such as a lever or button.

To allow the user to adjust the characteristics of the front suspension system 230 and the rear suspension system 232, the front suspension controller device 236 and the rear suspension controller device 238 include a front suspension electrical switch 236c and a rear suspension electrical switch 238c that are actuated by suspension input elements 236a, 238a, respectively, such as levers or buttons. Alternatively, the adjustable seat post assembly 226, the adjustable front suspension system 230, and the adjustable rear suspension system 232 may also be configured to receive the first shift signal 220b and/or the second shift signal 222b, so that these devices may also be controlled by operation of the first shift lever 220a and/or the second shift lever 222a.

The seat post controller device 234, the front suspension controller device 236, and the rear suspension controller device 238 include processors 234e, 236e 238e, respectively, that electronically process the manual input received by the seat post input element 234a, the front suspension input element 236a, and the rear suspension input element 238a, respectively. The seat post input triggers a seat post controller communication interface 234d to wirelessly send a seat post signal 234b. The front and rear suspension inputs trigger front and rear controller communication interfaces 236d, 238d, respectively, to wirelessly send a front suspension signal 236b and a rear suspension signal 238b, respectively. Correspondingly, the seat post assembly 226 includes a communication interface and a processor that is configured to receive and electrically process the seat post signal 234b to determine a designated response. The front and rear suspensions include communication interfaces and processors that are configured to receive and electronically process the front suspension signal 236b and the rear suspension signal 238b, respectively, to determine a designated response.

FIGS. 1A-1E and 2A-2C illustrate how various controller devices may be employed to wirelessly communicate control signals to different combinations of operation-enacting devices. The signals from the controller devices may be communicated wirelessly using any technique, protocol, or standard. For instance, Institute of Electrical and Electronics Engineers ("IEEE") 802.11 standards, IEEE 802.15.1 or BLUETOOTH® standards, and/or ANT™ or ANT+™ standards may be used. In some embodiments, however, control signals may be communicated wirelessly over a proprietary protocol, such as one that operates on top of the physical layer of the IEEE 802.15.4 wireless protocol.

Figure 3:
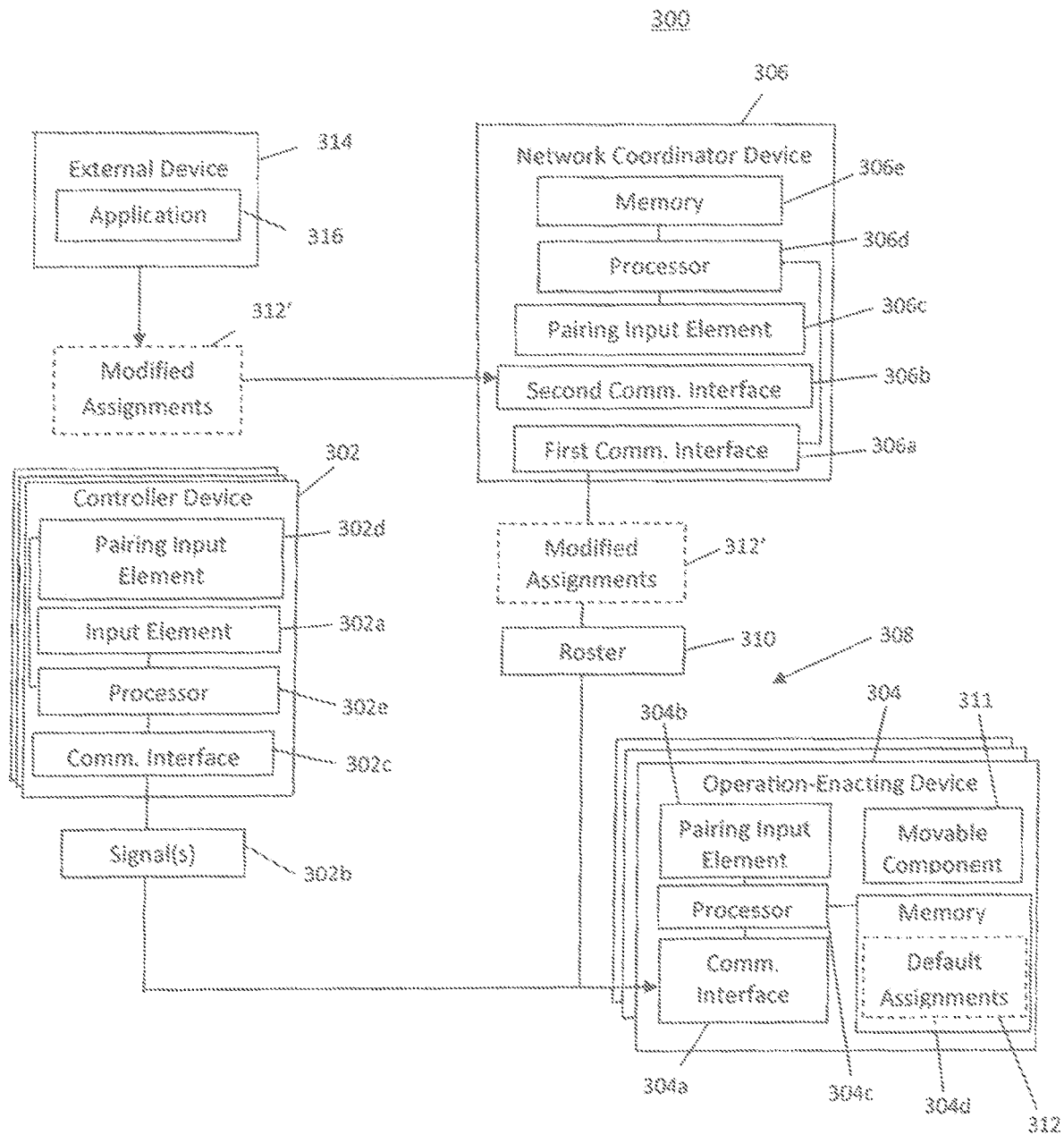
FIG. 3 illustrates an example system for controlling different combinations of operation-enacting devices on a bicycle, according to aspects of the present disclosure.

FIG. 3 illustrates an example system 300 for controlling different combinations of operation-enacting devices on a bicycle. The system 300 includes a plurality of controller devices 302. Each controller device 302 includes at least one respective input element 302a configured to receive input from a user. For example, as described above, the controller devices 302 may include a right controller device and a left controller device coupled to a handlebar assembly, where respective shifter levers act as input elements 302a. In general, input elements 302a may include any variety of shifter, pushbutton, clicker, switch, other toggled device, sensor (e.g., peddling sensor, etc.), or the like. A single controller device 302 may also include more than one input element 302a (e.g., two shifter levers, a plurality of push-buttons, etc.).

Each controller device of the plurality of controller devices 302 may include one or more additional components. For example, a respective controller device 302 may include a processor 302e, a communications interface 302c, and/or a memory. The plurality of controller devices 302 are configured to transmit to, for example, a plurality of operation-enacting devices 304, signals 302b (e.g., data streams including messages and/or message packets) indicating input received by the input elements 302a of the controller devices 302. For example, the first controller device 120 and the second controller device 122 may wirelessly transmit a first shift signal 120b and a second shift signal 120a as described above to indicate input received by the first shift lever 120a and the second shift lever 122a, respectively. The communications interface 302c may be or include any number of different types of transmitters. For example, the communications interface 302c may be or include a combined transmitter and receiver. In one embodiment, the communications interface 302c includes a radio configured to measure ambient radio frequency (RF) noise.

The system 300 also includes the plurality of operation-enacting devices 304, where each operation-enacting device 304 is configured to enact at least one respective operation on the bicycle. For example, the operation-enacting devices 304 may include a front derailleur, a rear derailleur, a height-adjustable seat post assembly, a front suspension system, and/or a rear suspension system as described above. Each operation-enacting device 304 may include at least one movable component 311 configured to modify an operative state of the bicycle. Each operation-enacting device of the plurality of operation-enacting devices 304 includes a processor 304c and may include a memory 304d.

In some cases, an operation-enacting device 304 may act on more than one component of the bicycle in a single operation. In other cases, a single operation may include more than one act on one or more components of the bicycle. In yet other cases, the operation may include a physical action and a wireless action, where the wireless action sends wireless signals to cause further action by other cooperative device(s).

The system 300 also includes a network coordinator device 306. The network coordinator device 306 includes a first communication interface 306a configured to communicate wirelessly with the controller devices 302 and the plurality of operation-enacting devices 304. Using the first communication interface 306a, the network coordinator device 306 may establish a wireless network 308 that enables communications between the network coordinator device 306, the controller devices 302, and the plurality of operation-enacting devices 304. Correspondingly, each controller device 302 includes a communication interface 302c and each operation-enacting device 304 includes a communication interface 304a for communicating with other devices (e.g., receiving and transmitting data/signals) on the wireless network 308. Each of the communication interfaces 304 may be or include any number of different types of receivers. In one embodiment, each of the communication interfaces 304 is or includes a combined transmitter and receiver. The network coordinator device 306 further includes a processor 306d and may include a memory 306e.

In the embodiment shown in FIG. 3, the network coordinator device 306 further includes a second communication interface 306b configured to communicate wirelessly with an external computing device 314, such as a smart phone, a computing tablet, a laptop, a personal computer, or the like. Using the second communication interface 306b, the network coordinator device 306 may establish a wireless network 308 that enables communications between the network coordinator device 306 and the external computing device 314. The external computing device 314 may include an application 316, such as a mobile application or other computer software.

Although the network coordinator device 306 may appear in FIG. 3 as a separate device, the features of a network coordinator device 306 in alternative embodiments may be provided by one or more of the other controller devices 302 and/or operation-enacting devices 304 such as a rear derailleur.

The processors 302e, 304c, 306d, for example, of the system 300 may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as through shared or parallel processing.

The memory 304d, 306e, for example, of the system 300 may be any number of different types of memory. For example, such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding or carrying a set of instructions for execution by a processor or that cause a computer system to perform any one or more of the methods or operations disclosed herein.

To power wireless communications and computer processing, the system 300 may include power supplies, which may be stored internal to the operating device or stored external to the operating device. The power supply may include a combination of multiple batteries or other power providing devices. Specially fitted or configured battery types, or standard battery types such as CR 2012, CR 2016, and/or CR 2032 may be used. In some embodiments, the devices in a system are all individually powered (e.g. by a dedicated battery).

As described above, the embodiments employ communication interfaces (e.g., communication interfaces 302c, 304a, 306a, and 306b). Such communication interfaces are configured to send data such as control signals and/or commands to bicycle components. In one embodiment, one or more transmitters of the communication interfaces include or are associated with a microprocessor (MCU) high frequency clock that may be transitioned from a wake mode to a sleep mode for power savings.

The communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustration or other representation of devices, such as the network coordinator devices 306, the controller devices 302, and the operation-enacting devices 304, include (even if not expressly labeled) any combination of processor(s), memory device(s) (e.g., computer-readable media storing program instructions for execution by processor(s)), communication interface(s), and power supply necessary to achieve the disclosed features.

At least some controller devices 302 of the plurality of controller devices 302, at least some operation-enacting devices of the plurality of operation-enacting device 304, and the network coordinator device 306 are paired into the wireless network 308, and a roster 310 is defined by the controller devices 302 and the operation-enacting devices 304 that have been paired to the wireless network 308 at the end of a pairing session. By fixing the roster 310, the system 300 only includes the devices 302, 304 selected by the user. The controller devices 302, the operation-enacting devices 304, and the network coordinator device 306 may be paired into the wireless network 308 using pairing input elements 302d, pairing input elements 304b, and pairing input element 306c, respectively. The pairing input elements 302d may be the same as or different than the input elements 302a of the controller devices 302, respectively.

When the pairing session ends, the network coordinator device 306 is configured to transmit, to the operation-enacting devices 304, the roster 310 identifying the controller devices 302 and the operation-enacting devices 304 paired to the wireless network 308. The operation-enacting devices 304 are configured to determine, based on the roster 310 received from the network coordinator device 306, how to enact operations in response to the signals 302b received from the controller devices 302.

The operation-enacting devices 304 are configured to process a default set of assignments 312 based on the roster 310 to determine how the operation-enacting devices 304 enact the operations responsive to the signals 302b. The default set of assignments 312 may be transmitted to each operation-enacting device 304 by the network coordinator device 306, and/or stored locally on each operation-enacting device 304.

For example, after a pairing session is completed, the roster 310 may include a right controller device with a right shift lever, a left controller device with a left shift lever, a front derailleur, and a rear derailleur. The default set of assignments 312 controlling the operation of the operation-enacting devices 304 is determined according to the particular set of devices in the roster 310. For example, the default set of assignments 312 may provide that with the example roster 310 above: (i) the rear derailleur shifts the chain to a sprocket inboard relative to the frame of the bicycle in response to a signal corresponding to a short duration or abbreviated button press from the right controller device (with no signals from the left controller device); (ii) the rear derailleur shifts the chain to a sprocket outboard relative to the frame of the bicycle in response to a signal corresponding to a long duration or extended button press from the right controller device (with no signals from the left controller device); and (iii) the front derailleur shifts the chain to an alternate chainring in response to a signal from the left controller device. If the roster 310 includes a different set of devices, the default set of assignments 312 may be different. For example, if the roster 310 includes a height-adjustable seat post assembly and does not include a front derailleur, the seat post assembly lowers the seat in response to a signal from the left controller device. Other configurations may be provided.

Although the default set of assignments 312 may provide an effective approach for determining how the operation-enacting devices 304 should respond to the signals 302b from the controller devices 302, the user may prefer to use a modified set of assignments 312'. For example, the modified set of assignments 312' may provide that with the example roster 310 above: (i) the rear derailleur shifts the chain to an inboard sprocket relative to the frame of the bicycle in response to signals corresponding to a short button press from the right controller device (without signals from the left controller device); (ii) the front derailleur shifts the chain to an alternate chainring in response to signals corresponding to a long button press from the right controller device (without signals from the left controller device); and (iii) the rear derailleur shifts the chain to the chain to an outboard sprocket relative to the frame of the bicycle in response to signals from the left controller device.

Accordingly, aspects of the present disclosure allow the assignments between the controller devices 302 and the operation-enacting devices 304 to be modified to reconfigure the system 300. As shown further in FIG. 3, the network coordinator device 306 may include the second wired and/or wireless communication interface 306b configured to receive the modified set of assignments 312', where the modified set of assignments 312' causes at least one operation enacted by an operation-enacting device 304 to occur in response to the signals 302b from a different controller device 302. The second communication interface 306b may employ a different protocol than the first communication interface 306a, particularly if the first communication interface 306a employs a proprietary protocol. The modified set of assignments 312' may be defined by the user within, for example, the mobile application, and transmitted to the operation-enacting devices 304 via the second wired and/or wireless communication interface 306b of the network coordinator device 306.

Figure 4:
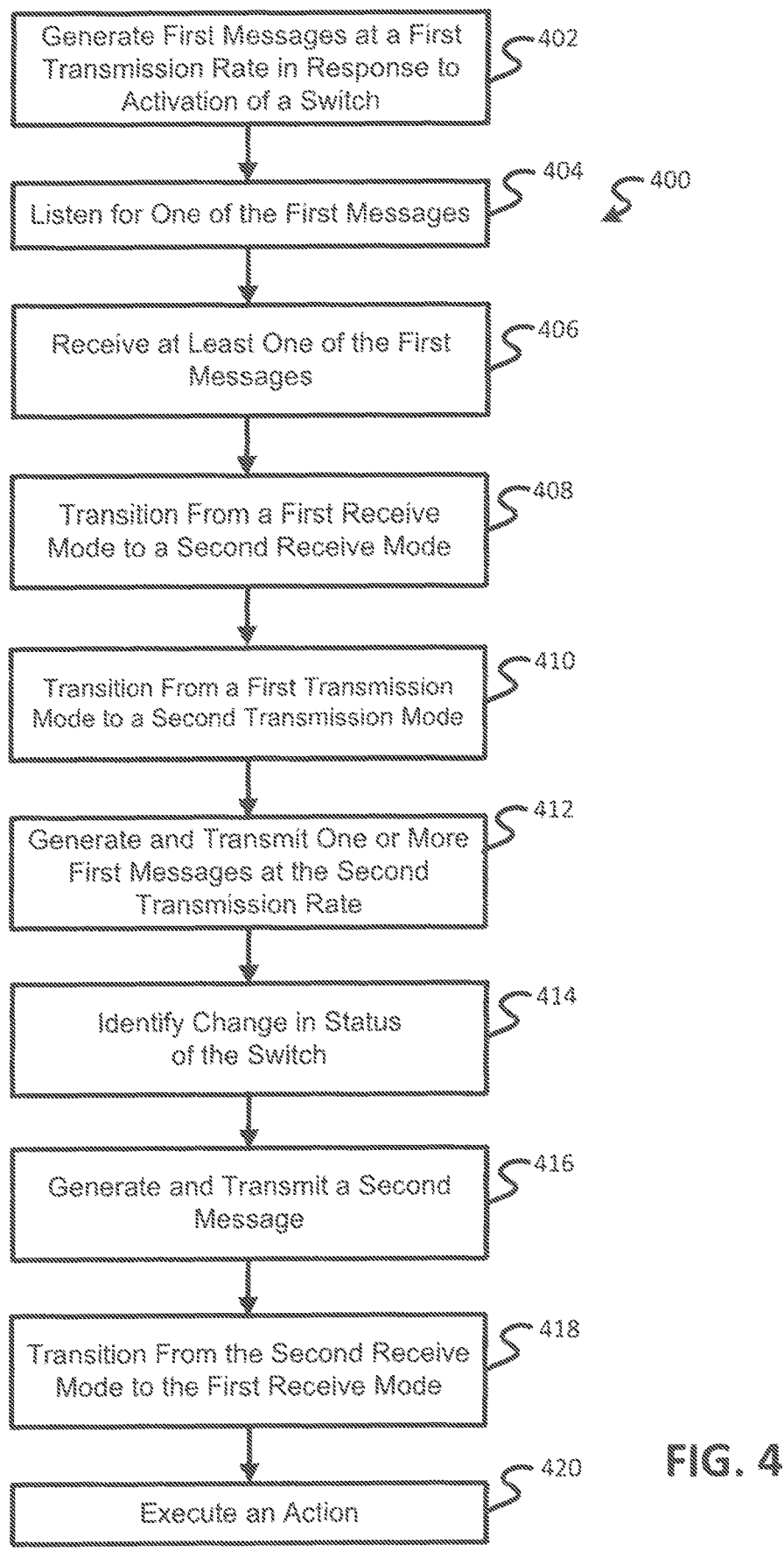
FIG. 4 is a flow chart of an embodiment of a method for controlling an electronic component of a bicycle.

FIG. 4 illustrates a method 400 for controlling one or more electronic components (e.g., the operation-enacting devices 304) of a bicycle. The acts of the method 400 presented below are intended to be illustrative. In some embodiments, the method 400 may be accomplished with one or more additional acts not described, and/or without one or more of the acts discussed. Additionally, the order in which the acts of the method 400 are illustrated in FIG. 4 and described below is not intended to be limiting. Some of the acts of the method 400 may be executed simultaneously, as illustrated in FIGS. 5-10.

In some embodiments, the method 400 may be implemented in one or more processing device (e.g. digital processor, an analog processor, a digital circuit designed to process information, an analog-circuit designed to process information, a state machine, and/or other mechanisms for electronically processing information). The one or more processing devices include one or more devices executing some or all the acts of the method 400 in response to instructions stored electronically on an electronic storage medium. The one or more processing devices are configured through hardware, firmware, and/or software to be specifically designed for execution of one or more of the acts of the method 400.

As presented in the following, acts may be performed using any combination of the components indicated in FIGS. 1A-1E, 2A-2C, 3, and/or other components. In one embodiment, at least some acts of the method 400 are executed by one or more processing devices of an operation-enacting device (e.g., an operation-enacting device 304 such as a rear derailleur). Alternatively or additionally, at least some acts of the method 400 may be executed by one or more processing devices of a controller device (e.g., a controller device 302).

In act 402, a first controller of the bicycle generates and transmits, from the first controller to a second controller of the bicycle, first messages for a first predetermined time period in response to activation of a switch of or corresponding to the first controller. The first controller may be a controller device (e.g., a controller device 302) of the bicycle or another device and/or may include a processor of the controller device or the other device (e.g., a rear derailleur). The first controller may generate the first messages in response to a user (e.g., a rider) pressing a button or a lever (e.g., an input element 302a) of the controller device on the bicycle (e.g., at the handlebar assembly 114), and transmit the first messages to, for example, the second controller over a wireless network (e.g., the wireless network 308). The second controller may include or be a processor of any number of components of the bicycle including, for example, a rear derailleur (e.g., an operation enacting device 304).

When, for example, the button is pressed by the rider, and the switch of the first controller is activated, the first controller begins sending first messages (e.g., first message packets) indicating that the button has been pressed. The first messages include data identifying that the button has been pressed (e.g., activation of the switch via the actuator). The first controller continues transmitting the first messages for the first predetermined time period. The first controller generates and transmits the first messages at a first transmission rate (e.g., in a first transmission mode). In one embodiment, the first transmission rate is continuous, and the first controller generates and transmits the first messages continuously in response to the activation of the switch of the first controller. Continuous transmission may allow for interleaving with other transmitters on a same communication channel. In another embodiment, the first transmission rate is periodic. The first predetermined time period and/or the first transmission rate may be set at manufacturing of the first controller and/or after manufacturing by a user (e.g., the rider) in any number of ways including, for example, via a mobile application in communication with the first controller.

The first messages may include any number of different types of data. For example, the first messages may include data identifying which button or buttons were pressed, a global rolling code, a message counter indicating a number of messages transmitted for a particular event (e.g., a particular button press or a particular button release), and/or other data.

In act 404, the second controller listens for one of the first messages generated and transmitted by the first controller. The second controller listens for one of the first messages in a first receive mode of the second controller. In the first receive mode, the second controller is configured to listen for one of the first messages at a first receive rate. The first receive rate may be periodic to save power. In other words, the second controller may not listen in a continuous receive mode to save power. For example, the second controller may turn on a receiver of the second controller for a shorter first part (e.g., 5 ms) of a receive period (e.g., 50 ms) of the second controller, and turn off the receiver of the second controller for a longer second part (e.g., 45 ms) of the receive period.

Act 402 and act 404 of the method 400 may occur simultaneously, in that the second controller listens for one of the first messages at the first receive rate while the first controller generates and transmits the first messages at the first transmission rate. At the beginning of a new transmission (e.g., corresponding to a new button press), the first controller may transmit the first messages for at least one full receive period of the second controller (e.g., a third predetermined time period). In one embodiment, the first predetermined time period is thus greater than or equal to the receive period of the second controller (e.g., 50 ms). In another embodiment, the first predetermined time period is less than the receive period of the second controller (e.g., shorter than the receive period but longer than the second part of the receive period). The first controller may have a minimum transmit time (e.g., the first predetermined time period), such that the first controller transmits long enough to overlap with at least one receive period of the second controller. In other embodiments, the first predetermined time period may be determined and set based on the first transmission rate, the first receive rate, the receive period, the first part of the receive period, and/or other rates and/or periods, such that overlap between transmission and receipt is provided.

Figure 5:
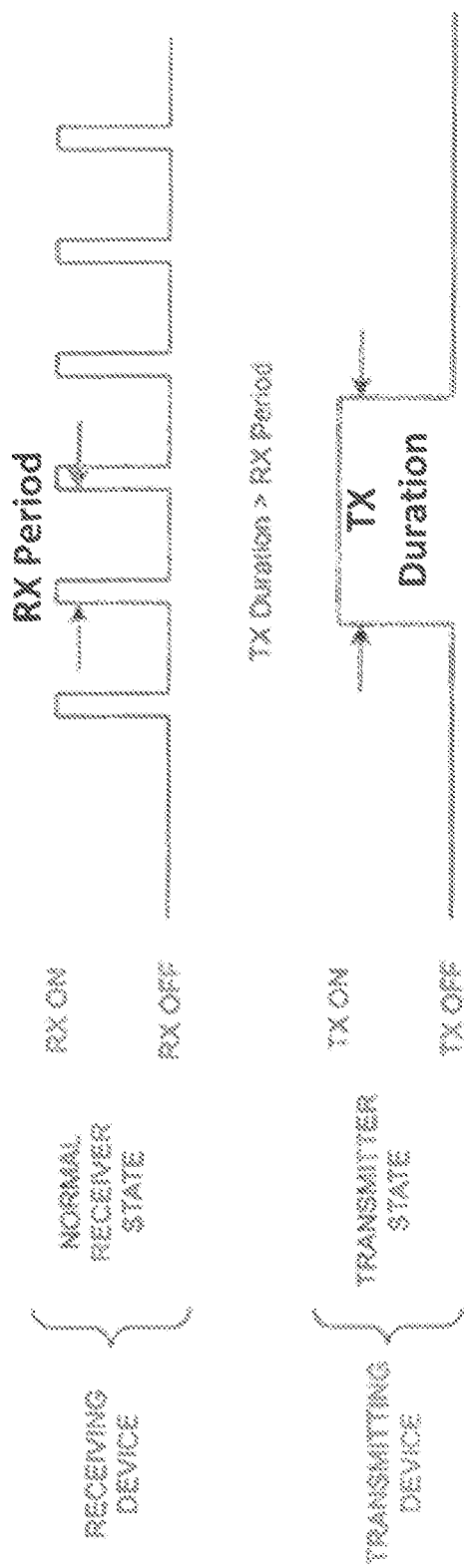
FIG. 5 is an example of a plot of receiver state over time for a periodic receive state compared to an example of a plot of transmitter state over time for an initial transmission.

FIG. 5 shows an example of a transmission of first messages by the first controller in response to a button press on the bicycle compared to receive periods of the second controller. FIG. 5 illustrates an example, in which the first controller (e.g., transmitting device) generates and transmits, from the first controller to the second controller (e.g., receiving device), first messages continuously for the first predetermined time period (e.g., TX Duration) in response to the button press. As shown in the example of FIG. 5, the first predetermined time period is greater than the receive period (e.g., RX Period), and the receiver of the second controller is on and configured to receive a portion of the first messages twice during the transmission (e.g., first parts of two receive periods, respectively). This provides for overlap between the transmission by the first controller and the listening by the second controller.

In act 406, the second controller receives at least one of the first messages transmitted by the first controller. The second controller may receive the at least one first message during one or more receive periods of the second controller (e.g., first parts of receive periods, respectively). For example, the first predetermined period may overlap a single receive period of the second controller, and the second controller may receive the at least one first message when the receiver of the second controller is turned on during the first part of the single receive period of the second controller. As another example, the first predetermined period may overlap two or more receive periods of the second controller (see FIG. 5), and the second controller may receive one or more first messages during each of the two or more receive periods.

In act 408, in response to receiving the at least one first messages (e.g., a first received first message, the one first message) in act 406, the second controller (e.g., the receiver of the second controller) transitions from the first receive mode to a second receive mode. In the second receive mode, the second controller is configured to listen for one or more additional messages (e.g., one or more additional first messages) at a second receive rate. The second receive rate is greater than the first receive rate. In other words, the receiver of the second controller is turned on more frequently and/or for longer period(s) of time in the second receive mode compared to the first receive mode. The first receive rate and/or the second receive rate may be defined at manufacture of the second controller and/or after manufacture of the second controller by a user (e.g., the rider) in any number of ways including, for example, via a mobile application in communication with the second controller.

In one embodiment, the second receive rate is continuous. In other words, after the second controller receives the one first message, the receiver of the second controller latches into a continuous receive state to receive subsequent messages from the first controller. In one embodiment, the second controller receives all subsequent messages (e.g., for a particular button press) generated and transmitted by the first controller.

Figure 6:
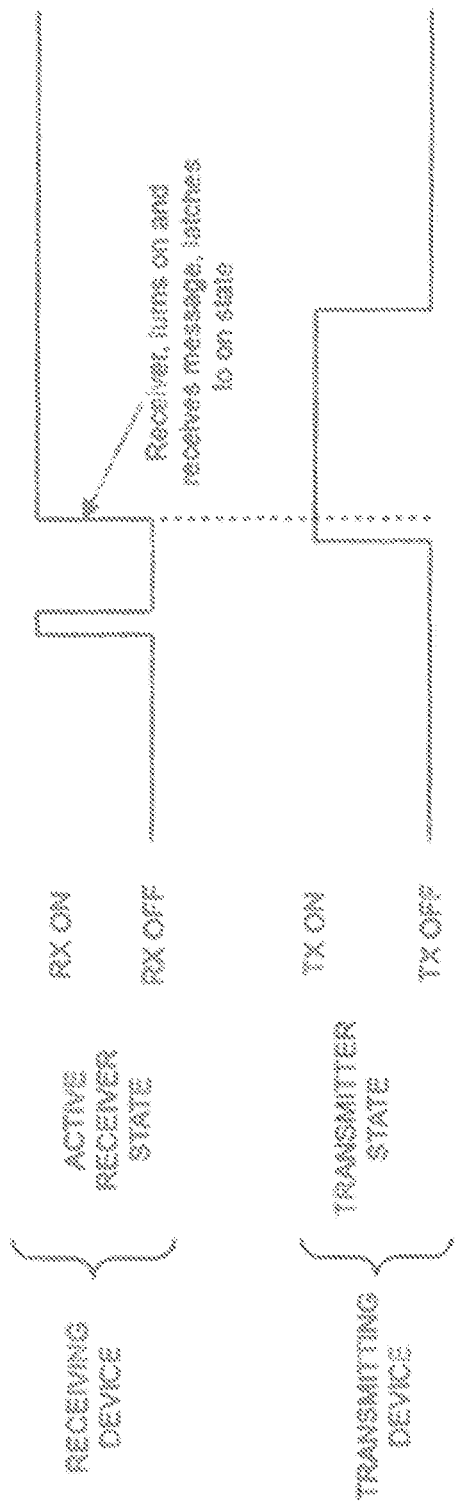
FIG. 6 is an example of a plot of receiver state over time for a transition from the periodic receive state to a continuous receive state compared to an example of a plot of transmitter state over time for an initial transmission.

FIG. 6 shows an example of a transition of the second controller from the first receive mode (e.g., periodic reception mode) to the second receive mode (e.g., continuous receive mode) after receiving the one first message from the first controller. As shown in FIG. 6, after the second controller turns on the receiver of the second controller during the first receive mode, and receives the one first message, the receiver of the second controller transitions to the second receive mode and latches to an "ON" state.

In act 410, after the first predetermined time period, the first controller transitions from the first transmission mode, in which the first controller generates and transmits first messages at the first transmission rate, to a second transmission mode, in which the first controller generates and transmits, from the first controller to the second controller, one or more first messages at a second transmission rate until the switch of the first controller is deactivated. For example, the first controller may generate and transmit first messages at the second transmission rate until the rider, for example, releases the button or the lever of the control device on the bicycle (e.g., deactivates the switch of the first controller). The second transmission rate may be set at and/or after manufacture of the first controller by a user (e.g., the rider) in any number of ways including, for example, via a mobile application in communication with the first controller.

The second transmission rate is less than the first transmission rate. In one embodiment, after the first predetermined time period, the first controller transitions from a continuous first transmission rate to a periodic second transmission rate (e.g., transmitting once every second predetermined time period or intermittent transmit time period). In another embodiment, after the first predetermined time period, the first controller transitions from a first periodic transmission rate to a second periodic transmission rate that is less than the first periodic transmission rate. In other words, after the first predetermined time period, the first controller generates and transmits, from the first controller to the second controller, less frequently.

In one embodiment, after the first controller has transmitted continuously, for example, for at least one full receive period (e.g., for a third predetermined time period, which is longer than the receive period), the first controller may stop sending first messages continuously in order to save power; the first controller transitions to transmitting first messages intermittently at, for example, the intermittent transmit time period. The second controller (e.g., the receiver of the second controller) remains in, for example, continuous receive mode (e.g., the second receive mode) for at least as long as the intermittent transmit time period (e.g., Intermittent TX Period) of the first controller. A period of the continuous receive mode (e.g., a latch on period) of the second controller is variable and may extend every time a first message is received by the second controller.

Figure 7:
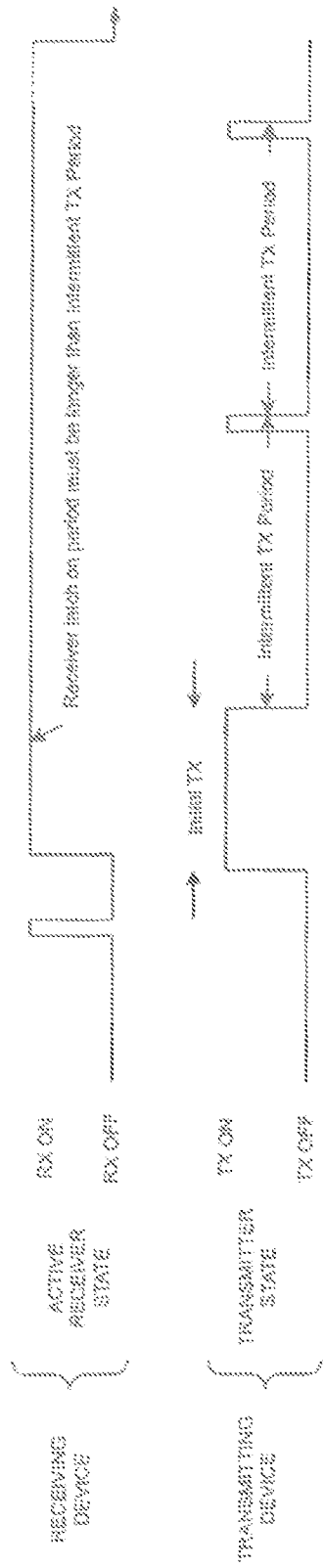
FIG. 7 is an example of a plot of receiver state over time for another transition from the periodic receive state to the continuous receive state compared to an example of a plot of transmitter state over time for a transition from a first transmission rate to a second transmission rate.

FIG. 7 shows an example of a transition of the first controller from the first transmission rate to the second transmission rate after the first predetermined time period, and another example of a transition of the second controller from the first receive mode (e.g., periodic reception mode) to the second receive mode (e.g., continuous receive mode) after receiving the one first message from the first controller. As shown in FIG. 7, the latch on period of the second controller is longer than the intermittent transmit period of the first controller.

In act 412, the first controller generates and transmits, from the first controller to the second controller, a respective first message of the one or more first messages according to the second transmission rate. The first controller generates and transmits the respective first message if the switch remains activated for an entire intermittent transmit time period. In other words, the first controller generates and transmits the respective first message if the button remains pressed over the course of a respective intermittent transmit time period.

Act 412 may be repeated any number of times. A number of times act 412 is repeated is based on a length of the button press, a length of the first predetermined time period, and a length of the intermittent transmit time period. For example, if the length of the button press is one second long, the first predetermined time period is 50 ms, and the intermittent transmit time period is 100 ms, act 412 may be repeated nine times. Other values for the length of the button press, the length of the first predetermined time period, and the length of the intermittent transmit time period may be provided.

The first controller includes a transmitter configured to transmit the first messages. The first controller may turn off the transmitter when the first controller is not transmitting the first messages. For example, the first controller may turn on the transmitter of the first controller for a shorter first part (e.g., 5 ms) of the intermittent transmit time period (e.g., 50 ms) of the first controller, and turn off the transmitter of the first controller for a longer second part (e.g., 45 ms) of the intermittent transmit time period.

Figure 8:
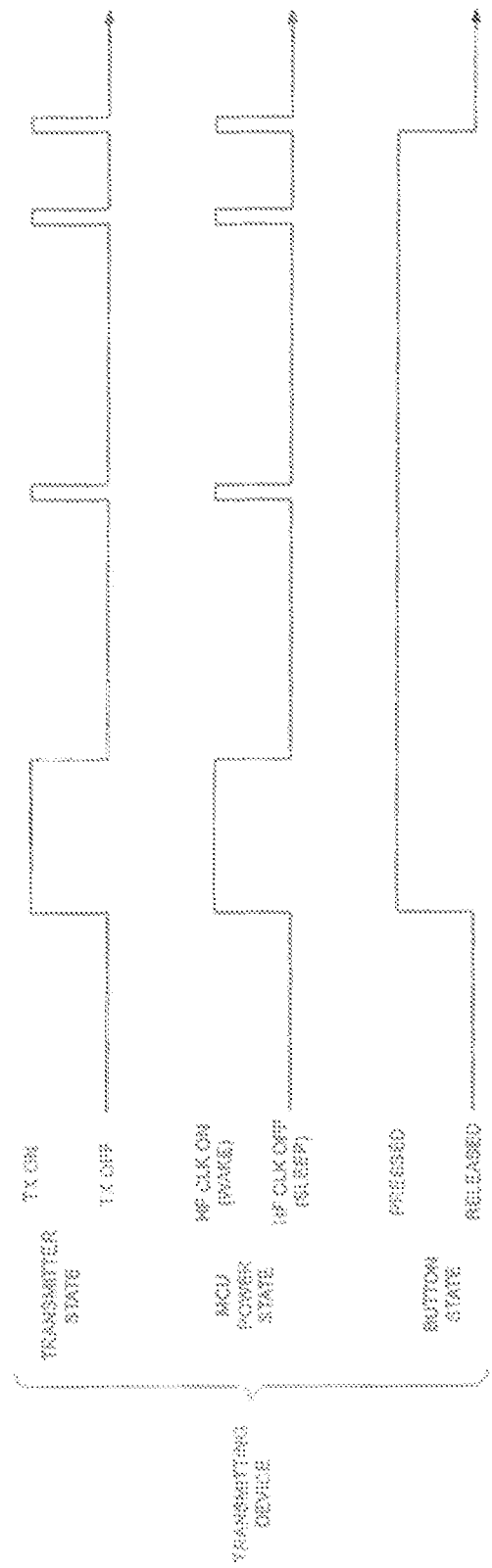
FIG. 8 is an example of a plot of button state over time compared to an example of a plot of transmitter state over time and an example of a plot of microcontroller power state over time.

In one embodiment, the first controller turns off a microprocessor (MCU) high frequency clock associated with the transmitter when the transmitter is turned off in order to further save power. FIG. 8 shows an example of button state over time compared to transmitter state over time and MCU power state over time. As illustrated in FIG. 8, the high frequency clock of the MCU is turned off (e.g., transitioned to sleep mode) when the transmitter of the first controller is off, and the high frequency clock of the MCU is turned on (e.g., transitioned to wake mode) when the transmitter of the first controller is on.

In act 414, the first controller identifies a change in status of the switch. For example, the switch may change from being activated (e.g., via actuation or pressing of the button on the bicycle) to being deactivated (e.g., e.g., via release of the button on the bicycle), and the first controller may identify the change.

In act 416, the first controller generates and transmits, from the first controller to the second controller, a second message (e.g., a second message packet) based on the change identified in act 414. The first controller may, for example, generate the second message in response to the rider, for example, releasing the button of the first controller, and transmit the second message to, for example, the second controller. The second message includes data identifying that the button has been released (e.g., deactivation of the actuator) and/or the switch has been deactivated (e.g., due to release of the button).

Figure 9:
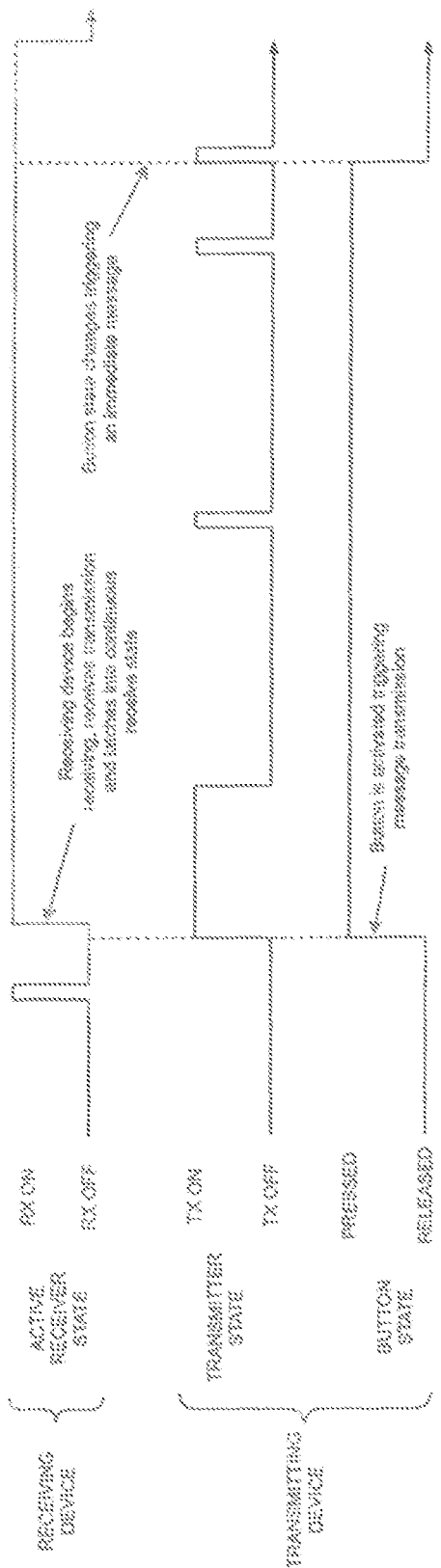
FIG. 9 is an example of a plot of button state over time for a button press and a button release compared to an example of a plot of transmitter state over time and an example of a plot of receiver state over time.

The first controller may generate and transmit the second message once (e.g., immediately after) the first controller identifies deactivation of the switch, for example, in act 414. For example, even if the first controller is between intermittent transmissions of first messages according to the second transmission rate, the first controller generates and transmits the second message when the deactivation of the switch is identified in act 414. FIG. 9 shows an example, in which a second message is immediately generated and transmitted by the first controller when the first controller identifies a button state change from pressed to released.

In one embodiment, the first controller does not generate and transmit, from the first controller to the second controller, the second message indicating the switch is deactivated. Instead, the first controller merely stops generating and transmitting, from the first controller to the second controller, first messages in response to the identification of the deactivation of the switch in act 414.

In act 418, the second controller transitions the receiver from the second receive mode back to the first receive mode. In other words, the second controller ends the latch on period of the receiver and transitions the receiver back into a power saving mode, during which the receiver listens for messages for part of each respective receive period. In one embodiment, when the second controller ends the latch on period of the receiver, the second controller transitions the receiver to a third receive mode, in which the receiver listens at a third receive rate that is greater than the first receive rate but less than the second receive rate.

In one embodiment, the second controller determines (e.g., counts) a time since a last received message (e.g., a first message or a second message) from the first controller, and compares the determined time to a predetermined time period. The predetermined time period may be a time period associated with the first controller such as, for example, the intermittent transmission time period. Based on the comparison, when the determined time is greater than the predetermined time period, the second controller transitions the receiver from the second receive mode back to the first receive mode (e.g., exits the continuous receive mode). In other words, the latch on period of the receiver extends every time a new message is received within the predetermined time period and ends when the second controller has not received a message from the first controller for more than the predetermined time period. In another embodiment, the second controller transitions the receiver from the second receive mode to the first receive mode after the second controller receives the second message from the first controller.

In act 420, the second controller may execute a primary action and/or a secondary action based on one or more of the first messages received from the first controller and/or the second message. For example, the second controller may execute the primary action in response to reception of the one first message or reception of the second message when the button press is a particular length (e.g., a short button press). The primary action may be any number of actions including, for example, the shifting of a rear derailleur of the bicycle inboard. As another example, the second controller may execute the secondary action in response to reception of the second message or the reception of the second message when the button press is a particular length (e.g., a long button press). As yet another example, the second controller may execute the primary action in response to the reception of the one first message (e.g., open a valve of a seat post assembly), and execute the secondary action in response to the reception of the second message (e.g., close the valve of the seat post assembly). In one embodiment, the second controller may repeat the primary action (e.g., inboard shift of the rear derailleur) each time a first message is received by the second controller during the second receive mode.

For example, the second controller may execute an inboard shift each time the second controller receives a first message while the receiver of the second controller is in the second receive mode. Other control may be provided, and other actions may be initiated.

One or more messages generated by, for example, the first controller and transmitted from, for example, the first controller to the second controller may not be received by the second controller. For example, ambient radio frequency (RF) noise on a communication channel may cause interference.

The first controller may include a radio configured to measure ambient RF power at a frequency of transmission from the first controller to the second controller. The first controller may compare the measured ambient RF power to a predetermined ambient threshold RF power. The first controller may compare the measured ambient RF power to the predetermined ambient threshold RF power any number of times. For example, the radio may measure the ambient RF power one or more times each time the first controller is in an active transmit state, before each message (e.g., each first message and second message) is transmitted by the first controller, after each message (e.g., each first message and second message) is transmitted by the first controller, or any combination thereof. The predetermined ambient threshold RF power may be set at manufacture of the first controller and/or after manufacture of the first controller by a user (e.g., the rider) in any number of ways including, for example, via a mobile application in communication with the first controller.

Figure 10:
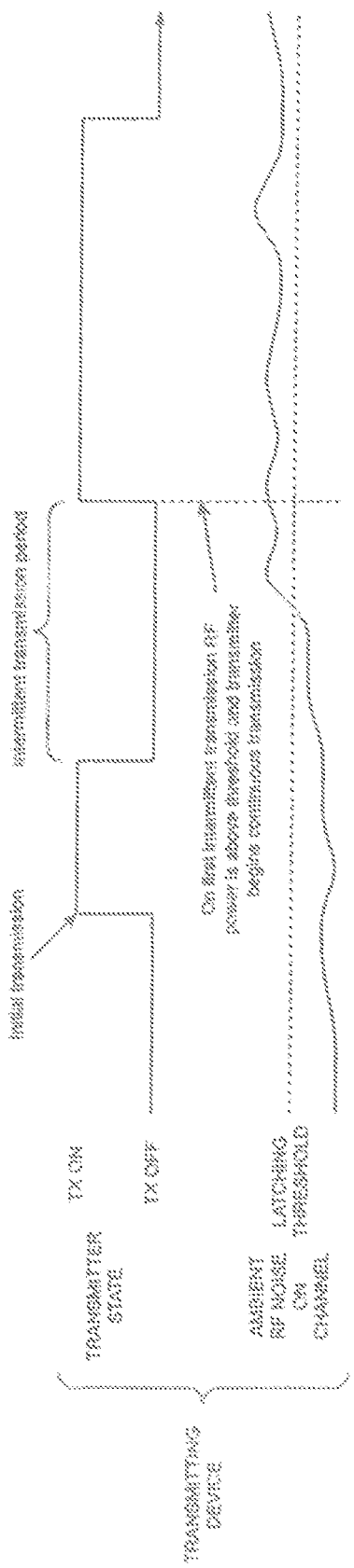
FIG. 10 is an example of a plot of transmitter state over time for a transition from an intermittent transmission mode to a continuous transmission mode based on an example plot of ambient radio frequency (RF) noise over time.

In order to maintain reliable communication between the first controller and the second controller, for example, the first controller may transition the transmitter of the first controller from an intermittent transmission mode (e.g., the second transmission mode) to a continuous transmission mode (e.g., the first transmission mode) when, based on the respective comparison, the first controller determines the measured ambient RF power is greater than the predetermined ambient threshold RF power. FIG. 10 shows an example of a transition of the transmitter of the first controller from an intermittent transmission mode to a continuous transmission mode when the measured ambient RF power (e.g., ambient RF noise on channel) is greater than the predetermined ambient threshold RF power (e.g., latching threshold). FIG. 10 illustrates an example in which the first controller transitions the transmitter of the first controller from the intermittent transmission mode to the continuous transmission mode at a first intermittent transmission the measured ambient RF power is greater than the predetermined ambient threshold RF power. In other words, the first controller waits until an intermittent transmission is to occur to transition from the intermittent transmission mode to the continuous transmission mode. In another example, the transmitter of the first controller transitions to the continuous transmission mode immediately after the first controller determines, based on the respective comparison, the measured ambient RF power is greater than the predetermined ambient threshold RF power.

An implied release mechanism (e.g., of the second controller) is configured to identify when the receiver of the second controller, for example, has not received the second message. In other words, the implied release mechanism is configured to identify when the receiver of the second controller has missed a release button message.

For example, when the button of the first controller is pressed and the switch is activated, the first controller generates and transmits, from the first controller to the second controller, first messages, and the second controller receives the one first message. The one first message indicates to the second controller the button has been pressed and/or the switch has been activated. During the button press, the first controller may lose power, such that the first controller does not generate and transmit, from the first controller to the second controller, the second message, which indicates the button has been released and/or the switch has been deactivated. The implied release mechanism provides that the receiver of the second controller, for example, is to assume, after not receiving a message (e.g., a first message or a second message) for a predetermined period of time (e.g., a checkin timer) that the switch has been deactivated and the button has been released. The second controller, for example, then triggers an implied release.

In one embodiment, the second controller is configured to track (e.g., count) a time since a most recently received message from the first controller. When the most recently received message from the first controller is a first message identifying a button press and/or activation of the switch corresponding to the button, for example, the second controller is further configured to compare the time since the most recently received message to a predetermined time period (e.g., the checkin timer). When, based on the comparison, the time since the most recently received message is greater than the predetermined time period, the second controller assumes the switch has been deactivated and the button has been released. The second controller may be configured to initiate an action of an electronic component (e.g., the rear derailleur or the valve of the seat post assembly) assigned to the assumed switch deactivation and button release.

An implied press mechanism (e.g., of the second controller) is configured to identify when the receiver of the second controller, for example, has not received a first message (e.g., the one first message). In other words, the implied press mechanism is configured to identify when the receiver of the second controller has missed all press button message prior to a received release button message.

For example, when the button of the first controller is pressed and the switch is activated, the first controller generates and transmits, from the first controller to the second controller, first messages. Due to interference and/or other reasons, the second controller may not receive the first messages (e.g., the first messages may be lost). Alternatively or additionally, the first controller may not generate or transmit some or all of the first messages due to an error at the first controller. The receiver of the second controller may receive the second message indicating the button release without any corresponding first messages indicating the button press. The implied press mechanism provides that the receiver of the second controller, for example, is to assume, with a predetermined period of time (e.g., the checkin timer) of no messages being received prior to the receipt of the second message, that the switch was previously activated in response to the button being pressed. The second controller, for example, then triggers an implied press after receipt of the second message.

In one embodiment, when the receiver of the second controller receives a second message identifying a button release without receiving any corresponding first messages, which indicate a previous button press, the second controller is configured to imply a button press corresponding to the identified button release when the receiver has not received any messages within a predetermined time period (e.g., the checkin timer) prior to receipt of the second message. The second controller is further configured to initiate an action of an electronic component (e.g., the rear derailleur or the valve of the seat post assembly) assigned to the implied button press and switch activation.

Figure 11:
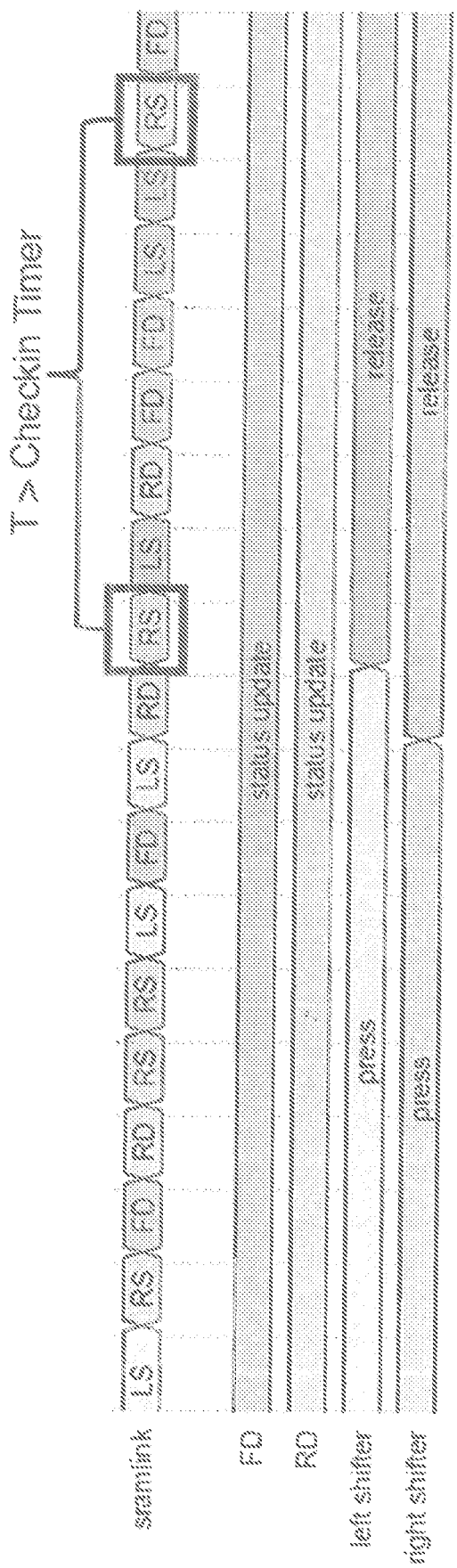
FIG. 11 illustrates an example of different messages generated and transmitted on a communication channel and triggering of an implied button press.

FIG. 11 shows an example of the second controller, for example, triggering an implied press due to a time T being greater than the checkin timer. The time T represents a time period between a last received second message indicating, for example, button release from the first controller (e.g., the right shifter) and a next-to-last received message (e.g., another second message). In other words, a time between received release messages is greater than the checkin timer, and the implied press is triggered.

The checkin timer for bicycle component control of the prior art may be set to, for example, 200 ms. With the lower power button press and hold described above, during which messages may be generated and transmitted periodically after the first predetermined time period, there is the danger of unintentional implied presses being triggered by the second controller, for example, due to a length of time between each press message. The checkin timer may thus be increased to, for example, 400 ms to avoid unintentional implied presses being triggered. Other checkin timer values may, however, be used.

With the low power button press and hold described above enabled, the button may need to be pressed longer compared to control devices of the prior art to enter a pairing mode, as enough time for a button press and hold for, for example, a multiple gear shift or a seat post height adjustment is to be provided. The first controller (e.g., a control device), for example, may enter the pairing mode when the button is pressed, and the switch is activated, longer than a predetermined pairing mode threshold time period. The predetermined pairing mode threshold time period may be increased compared to the control devices of the prior art to account for the button press and hold. For example, the predetermined pairing mode threshold time period may be four seconds, though other predetermined pairing mode threshold time periods may be used.

Figure 12:
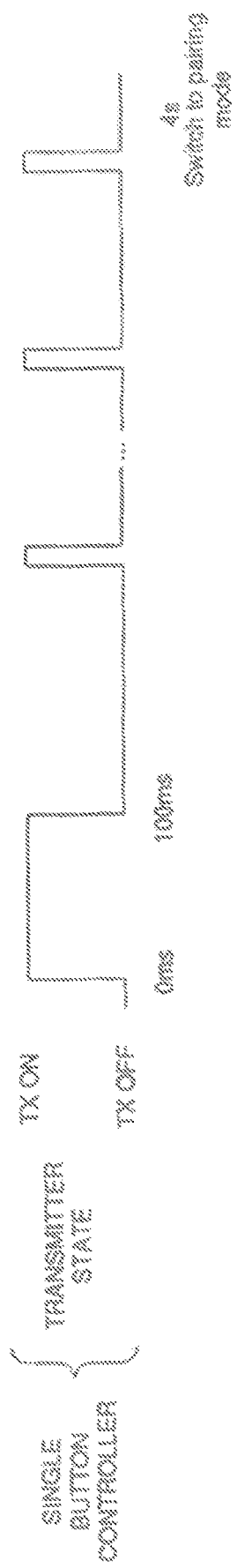
FIG. 12 is an example of a plot of transmitter state over time for transition of a control device to a pairing mode.

Referring to FIG. 12, which is an example plot of transmission state over time for a single button control device, the transmitter of the first controller, for example, is turned on and generates and transmits first messages at the first transmission rate (e.g., continuous transmission) for the first predetermined time period (e.g., 100 ms) after the button is first pressed. After the first predetermined time period, the transmitter of the first controller then transitions to the second transmission rate (e.g., periodic transmission) and turns on and generates and transmits first messages periodically. If the button remains pressed for the entire predetermined pairing mode threshold time period (e.g., four seconds), the first controller enters the pairing mode. In one embodiment, the first controller may generate and transmit, from the first controller to the second controller, a message indicating the pairing mode has been entered so that the second controller does not initiate any actions in response to the transmitted and received first messages.

In one embodiment, the first controller, for example, is configured to determine (e.g., count or track) an amount of time the switch has been activated (e.g., via the button). The first controller is configured to compare the determined amount of time to a predetermined pairing mode threshold time period. The predetermined pairing mode threshold time period may be set during and/or after manufacture of the first controller. For example, the predetermined pairing mode threshold time period may be set by, for example, the rider via a mobile application in communication with the first controller. Based on the comparison, the first controller is configured to transition the first controller to a pairing mode when the determined amount of time is greater than the predetermined pairing mode threshold time period. When the button is released before the end of the predetermined pairing mode threshold time period (e.g., the button is pressed for less than four seconds), the second controller, for example, may initiate an action of an electronic component of the bicycle assigned to the particular button press.

In accordance with various embodiments of the present disclosure, the methods described herein may be implemented with software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A control device of a bicycle, the control device comprising:
an actuator; and
a first controller configured to:
generate and transmit, from the first controller to a second controller of the bicycle, messages for a predetermined time period at a first transmission rate in response to activation of the actuator; and
after the predetermined time period, generate and transmit, from the first controller to the second controller, one or more messages at a second transmission rate until the actuator is deactivated,
wherein the first transmission rate is greater than the second transmission rate, and each of the messages includes data identifying the activation of the actuator.

2. The control device of claim 1, wherein the first controller is further configured to generate and transmit, from the first controller to the second controller, a second message in response to deactivation of the actuator, the second message including data identifying the deactivation of the actuator.

3. The control device of claim 2, wherein the first controller is further configured to:
   determine an amount of time the actuator has been activated;
   compare the determined amount of time to a predetermined pairing mode threshold time period; and
   based on the comparison, transition the first controller to a pairing mode when the determined amount of time is greater than the predetermined pairing mode threshold time period, and
   wherein the generation and transmission of the second message comprises generation and transmission, from the first controller to the second controller, of the second message in response to the deactivation of the actuator when, based on the comparison, the determined amount of time is less than the predetermined pairing mode threshold time period.

4. The control device of claim 1, wherein the predetermined time period is a first predetermined time period, and
   wherein the transmission of the one or more messages at the second transmission rate comprises periodic transmission of the one or more messages, the periodic transmission of the one or more messages comprising transmission of a respective message of the one or more messages once every second predetermined time period.

5. The control device of claim 4, wherein the transmission of the messages from the first controller to the second controller at the first transmission rate comprises continuous transmission of the messages from the first controller to the second controller while the second controller is in an intermittent receive mode, in which the second controller is configured to receive packets during part of every third predetermined time period.

6. The control device of claim 5, wherein the first predetermined time period is greater than the third predetermined time period.

7. The control device of claim 1, wherein the first controller comprises a transmitter,
   wherein the transmitter is configured to intermittently transmit the one or more messages, such that the one or more messages are transmitted at the second transmission rate, and
   wherein the first controller is configured to turn off the transmitter between the intermittent transmissions of the one or more messages.

8. The control device of claim 7, wherein the first controller is further configured to turn off a microprocessor high frequency clock of the transmitter between the intermittent transmissions of the one or more messages.

9. The control device of claim 1, wherein the first controller comprises a radio,
   wherein the radio is configured to measure ambient radio frequency power at a frequency of the transmission of the messages at the first transmission rate,
   wherein the first controller is further configured to:
      compare the measured ambient radio frequency power to a predetermined ambient threshold radio frequency power; and
      based on the comparison, when the measured ambient radio frequency power is greater than the predetermined ambient threshold radio frequency power, transition the generation and transmission of the one or more messages at the second transmission rate to continuous generation and transmission of the messages.

10. The control device of claim 9, wherein the radio is configured to measure the ambient radio frequency power before, after, or before and after the transmission of each message of the one or more messages.

11. An electronic component of a bicycle, the electronic component comprising:
    a first controller configured to:
       listen for a message in a first receive mode of the first controller, in which the first controller is configured to listen for the message at a first receive rate;
       receive the message from a second controller of the bicycle; and
       in response to the receipt of the message, transition the first controller from the first receive mode to a second receive mode, in which the first controller is configured to listen for one or more additional messages at a second receive rate,
    wherein the second receive rate is greater than the first receive rate.

12. The electronic component of claim 11, wherein the first controller is further configured to exit the second receive mode of the first controller when the first controller does not receive an additional message of the one or more additional messages within a predetermined time period associated with the second controller.

13. The electronic component of claim 12, wherein the predetermined time period associated with the second controller is an intermittent transmit time period of the second controller.

14. The electronic component of claim 12, wherein the exit of the second receive mode of the first controller comprises transition of the first controller from the second receive mode to the first receive mode.

15. The electronic component of claim 11, wherein the electronic component is a rear derailleur, a front derailleur, a seat post assembly, or a suspension assembly of the bicycle.

16. The electronic component of claim 11, wherein the first controller comprises a receiver and a processor, and
    wherein the processor of the first controller is configured to turn off the receiver of the first controller during part of every respective receive time period corresponding to the first receive rate.

17. The electronic component of claim 11, wherein the second receive mode is a continuous receive mode.

18. The electronic component of claim 11, wherein when the received message includes data indicating deactivation of a switch of the second controller, the first controller is further configured to:
    initiate an action of the electronic component when the first controller has not received any messages including data indicating activation of the switch within a predetermined time period prior to the receipt of the message.

19. The electronic component of claim 11, wherein when the received message includes data indicating activation of a switch of the second controller, the first controller is further configured to:
    identify a most recently received message, the most recently received message being the received message or an additional message of the one or more additional messages;

when the most recently received message includes the data indicating activation of the switch of the second controller:
  determine a time period since the most recently received message; and
  assume the switch of the second controller has been deactivated when the determined time period is greater than a predetermined time period; and
initiate an action of the electronic component based on the assumed deactivation of the switch of the second controller.

20. A method for controlling an electronic component of a bicycle, the method comprising:
  generating, by a first controller of the bicycle, and transmitting, from the first controller to a second controller of the bicycle, messages for a first predetermined time period at a first transmission rate in response to activation of a switch of the first controller;
  listening, by the second controller, for one of the messages in a first receive mode of the second controller, in which the second controller is configured to listen for the message at a first receive rate;
  receiving, by the second controller, the one message;
  in response to the receiving, transitioning the second controller from the first receive mode to a second receive mode, in which the second controller is configured to listen for one or more additional messages at a second receive rate, the second receive rate being greater than the first receive rate; and
  after the first predetermined time period, generating, by the first controller, and transmitting, from the first controller to the second controller, one or more messages at a second transmission rate until the switch is deactivated, the second transmission rate being less than the first transmission rate.

* * * * *